(12) United States Patent
Ohmiya

(10) Patent No.: US 8,305,414 B2
(45) Date of Patent: Nov. 6, 2012

(54) WRITE CONTROL CIRCUIT WITH OPTIMIZED FUNCTIONAL DISTRIBUTION

(75) Inventor: Satoshi Ohmiya, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1199 days.

(21) Appl. No.: 11/567,493

(22) Filed: Dec. 6, 2006

(65) Prior Publication Data

US 2007/0133016 A1    Jun. 14, 2007

(30) Foreign Application Priority Data

Dec. 6, 2005 (JP) ................................ 2005-352135
Dec. 4, 2006 (JP) ................................ 2006-326727

(51) Int. Cl.
*B41J 2/435* (2006.01)
*B41J 2/47* (2006.01)

(52) U.S. Cl. ......................... 347/237; 347/247; 347/240

(58) Field of Classification Search .................. 347/237, 347/232, 247, 240
See application file for complete search history.

(56) References Cited

U.S. PATENT DOCUMENTS

| 5,424,807 | A  | * | 6/1995 | Ohmura ...................... 399/366 |
| 6,295,077 | B1 | * | 9/2001 | Suzuki .......................... 347/237 |
| 2002/0085081 | A1 | | 7/2002 | Tanimoto et al. |
| 2002/0122217 | A1 | | 9/2002 | Nakajima |
| 2004/0070663 | A1 | | 4/2004 | Niito |
| 2004/0252182 | A1 | * | 12/2004 | Wakasugi ...................... 347/251 |
| 2006/0023231 | A1 | | 2/2006 | Ohmiya |
| 2006/0055767 | A1 | * | 3/2006 | Mochimaru et al. .......... 347/234 |

FOREIGN PATENT DOCUMENTS

| EP | 0 998 128 A2 | 5/2000 |
| JP | 62-279952 | 12/1987 |
| JP | 2001-138570 | 5/2001 |
| JP | 2002-300366 | 10/2002 |
| JP | 2003-29495 | 1/2003 |
| JP | 2004-336416 | 11/2004 |
| JP | 2005-96094 | 4/2005 |
| JP | 2005-178080 | 7/2005 |

OTHER PUBLICATIONS

U.S. Appl. No. 11/695,315, filed Apr. 2, 2007, Ohmiya.
Office Action issued Dec. 20, 2011, in Japanese Patent Application No. 2006-326727.

* cited by examiner

*Primary Examiner* — Stephen Meier
*Assistant Examiner* — Sarah Al Hashimi
(74) *Attorney, Agent, or Firm* — Oblon, Spivak, McClelland, Maier & Neustadt, L.L.P.

(57) ABSTRACT

A write control circuit for controlling driving of a plurality of light sources each including a laser diode for emitting light includes a plurality of write control mechanisms configured to control the plurality of laser diodes to perform writing for image forming with a plurality of colors. Each of the plurality of write control mechanism includes at least one image development part for developing and processing image data and at least one laser diode control part for controlling driving of the laser diodes.

10 Claims, 18 Drawing Sheets

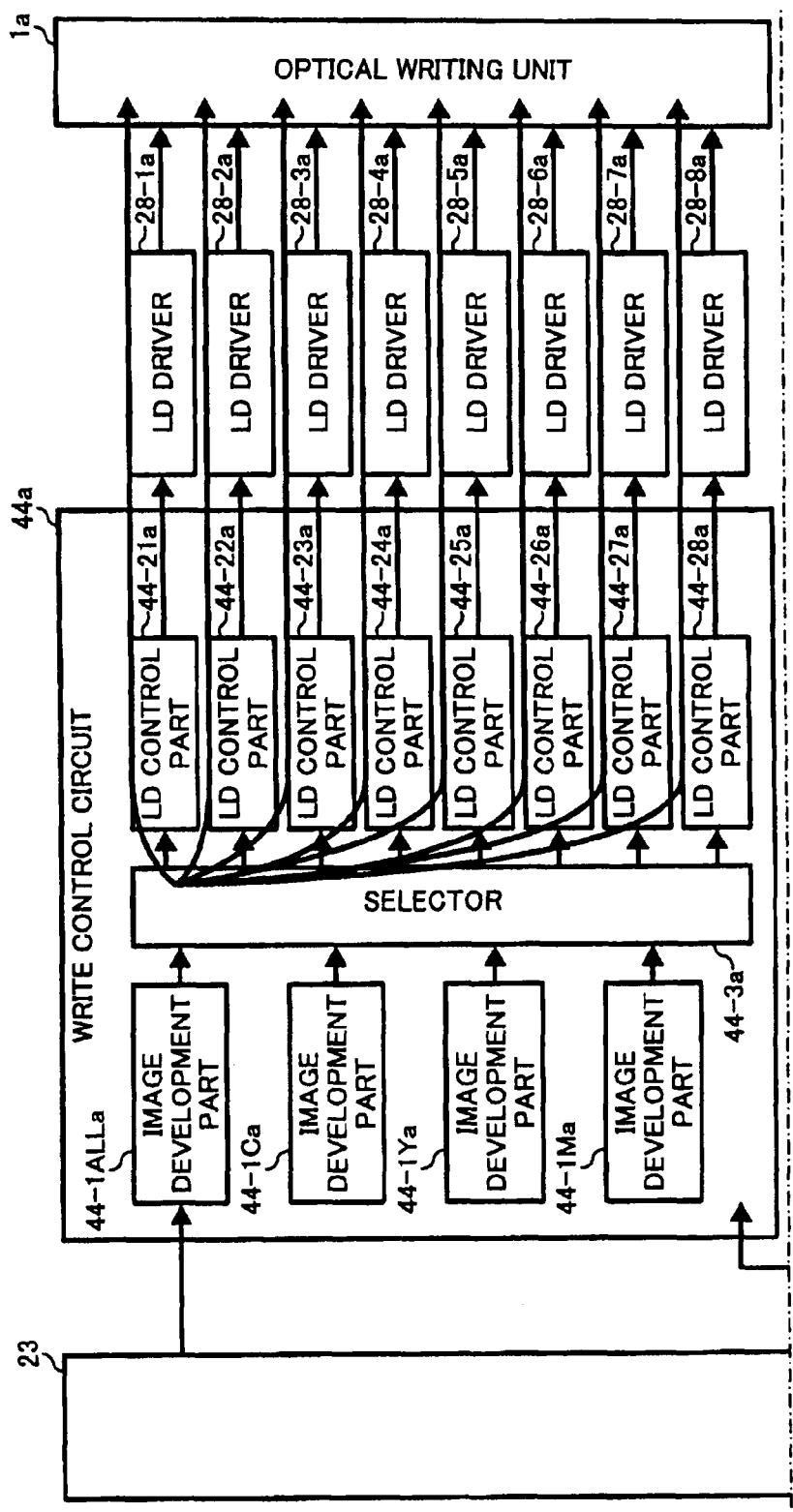

WRITE CONTROL CIRCUIT WITH OPTIMIZED FUNCTIONAL DISTRIBUTION

BACKGROUND OF THE INVENTION

1. Field of the Invention

The present invention relates to a write control circuit, and more particularly to a write control circuit for performing laser diode control with optimized functional distribution.

2. Description of the Related Art

A background color image forming apparatus generally forms a color image by superimposing a plurality of color images.

FIG. 1 is a block diagram illustrating a configuration of a control circuit of a background color image forming apparatus 100. As shown in FIG. 1, the background color image forming apparatus 100 includes a control system having an engine control unit 132 such as a CPU, an image processing circuit 23, write control circuits 140K, 140C, 140Y, and 140M for four colors, namely black, cyan, yellow, and magenta (hereinafter, referred to as K, C, Y, and M, respectively, as necessary), and laser diode (hereinafter, referred to as LD as necessary) driver circuits 128 for K, C, Y, and M controlled by the write control circuits 140K, 140C, 140Y, and 140M, respectively. The background color image forming apparatus 100 further includes an optical writing unit 1, a scanner 21 and a printer driver 22.

The image processing circuit 23 performs an image processing operation on image information supplied by the scanner 21 or an image data signal supplied by the printer driver 22 to prepare image data for the four colors, and supplies the respective write control circuits 140K, 140C, 140Y, and 140M with the image data for the respective colors. The image processing operation of the image processing circuit 23 includes color data conversion from RGB to CMYK, rotation, editing, and so forth.

The respective write control circuits 140K, 140C, 140Y, and 140M are supplied with control information from the engine control unit 132.

The background image forming apparatus 100 has a general configuration such that although the four write control circuits 140K, 140C, 140Y, and 140M have the same configurations, the four write control circuits 140K, 140C, 140Y, and 140M are separately provided for the respective colors.

Generally, in recent years, a write control circuit has been configured as an integrated circuit (hereinafter, referred to as IC). Since development of an IC incurs a huge cost, it is not practical to provide an image forming apparatus with respective ICs for a plurality of similar functions.

Therefore, in general, a single write control IC that covers all functions needed for forming images in respective colors has been developed, and the write control IC is mounted to an image forming apparatus for each of the colors.

Another background image forming apparatus includes respective write control mechanisms for a plurality of image forming colors to control respective light sources. The respective write control mechanisms include a write image processing mechanism for processing image data for base colors, an LD control mechanism including an LD driver for controlling an LD being the light source, and a synchronization detection control mechanism for detecting a write start position in a main scanning direction. The respective write control mechanisms are configured as respective ICs.

However, the write control mechanisms may include a function that does not need to be included for each of the image forming colors. For example, a function for managing writing timing for all the image forming colors does not need to be included in each of the write control mechanisms. Such a function could be satisfactorily included in one of the write control mechanisms.

SUMMARY OF THE INVENTION

This patent specification describes a write control circuit for controlling driving of a plurality of light sources each including a laser diode for emitting light, which includes a plurality of write control mechanisms configured to control the plurality of laser diodes to perform writing for image forming with a plurality of colors, wherein each of the plurality of write control mechanism includes at least one image development part for developing and processing image data and at least one laser diode control part for controlling driving of the laser diodes.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 14A-14D are a block diagram for explaining an exemplary configuration for write control of a color image forming apparatus according to another embodiment of the present invention.

DETAILED DESCRIPTION OF THE PREFERRED EMBODIMENTS

Figure 1:
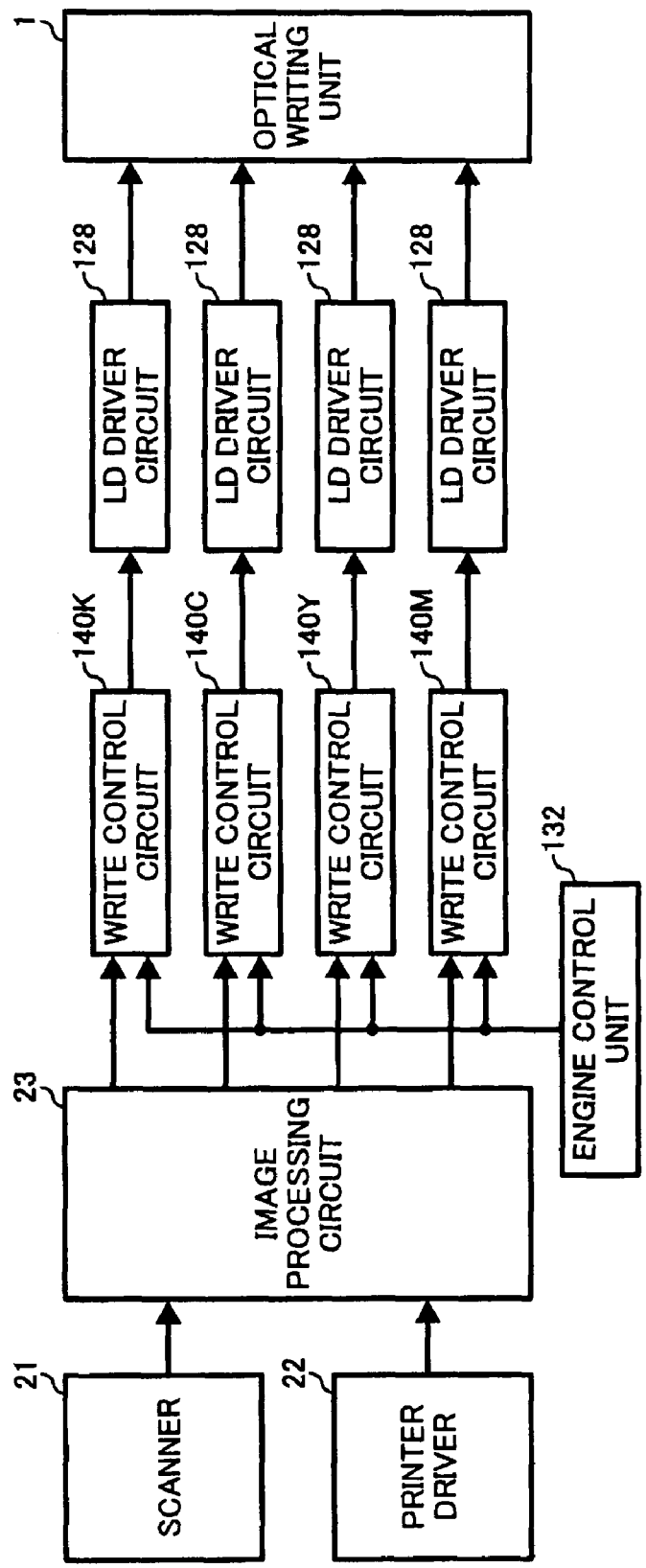
FIG. 1 is a block diagram illustrating a configuration of a control circuit of a background color image forming apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, a color image forming apparatus according to an exemplary embodiment of the present invention is described.

In the explanations below, the same reference numerals basically represent the same components unless otherwise noted.

Figure 2:
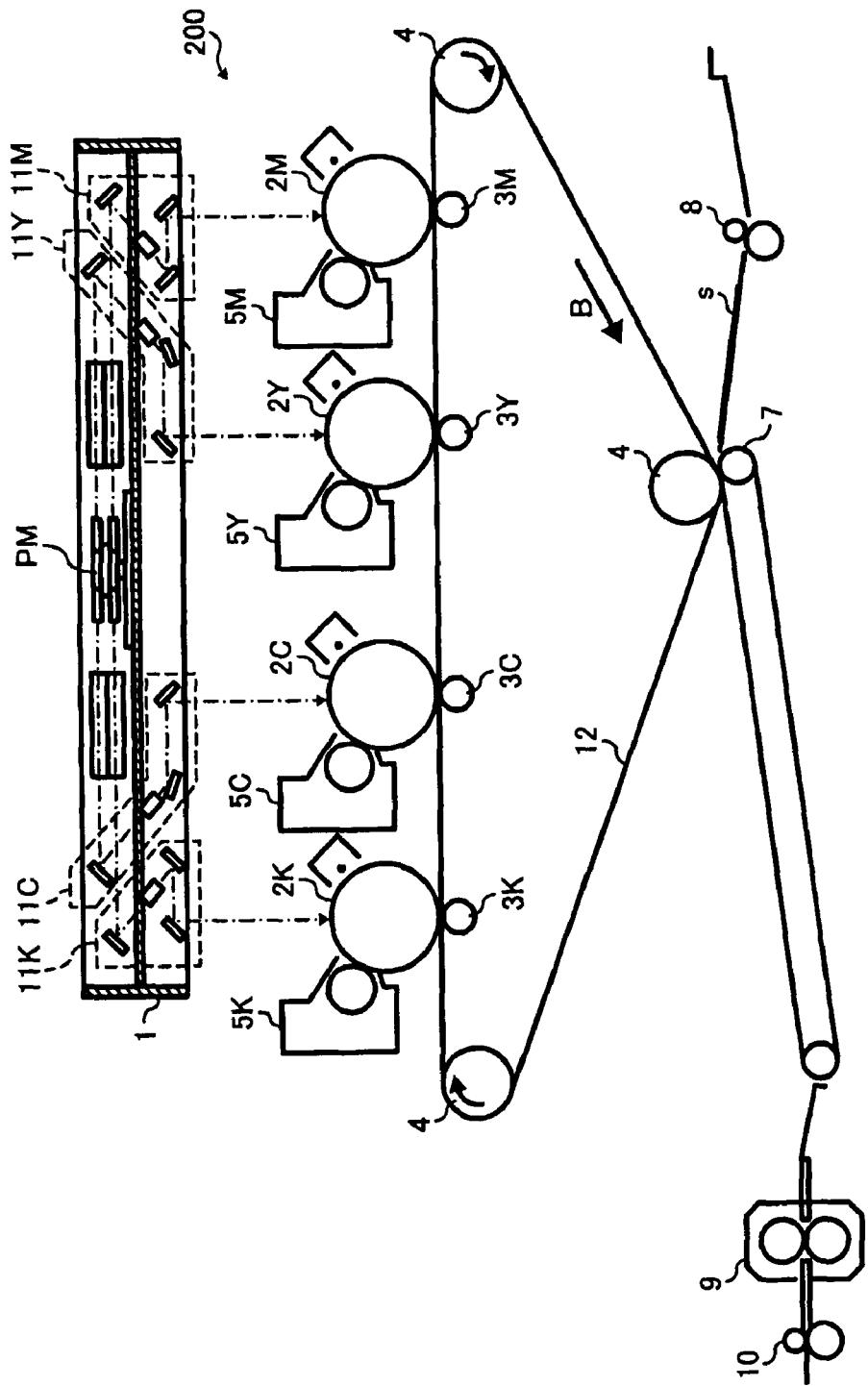
FIG. 2 is a schematic illustration of an exemplary image forming mechanism of a color image forming apparatus according to an exemplary embodiment of the present invention.

FIG. 2 is a schematic illustration of an exemplary image forming mechanism of a color image forming apparatus 200 according to an exemplary embodiment of the present invention. The color image forming apparatus 200 adopts an indirect transfer method, and is a tandem image forming apparatus.

In the embodiment of the present invention, the color image forming apparatus 200 performs full color image forming using four colors, namely black, cyan, yellow, and magenta (hereinafter, referred to as K, C, Y, and M, respectively).

As shown in FIG. 2, the color image forming apparatus 200 includes an optical writing unit 1, four photoconductive drums 2K, 2C, 2Y, and 2M (hereinafter, also collectively referred to as photoconductive drums 2), and four primary transfer units 3K, 3C, 3Y, and 3M (hereinafter, also collectively referred to as primary transfer units 3). The color image forming apparatus 200 further includes a plurality of drive rollers 4, charge units (not shown), cleaning units (not shown), and discharge units (not shown). The color image forming apparatus 200 further includes four development units 5K, 5C, 5Y, and 5M (hereinafter, also collectively referred to as development units 5), a secondary transfer unit 7, registration rollers 8, a fixing unit 9, sheet discharge rollers 10, and an intermediate transfer belt 12. The color image forming apparatus 200 further includes four optical systems 11K, 11C, 11Y, and 11M (hereinafter, also collectively referred to as optical systems 11).

The optical writing unit 1 includes a polygon motor (not shown), two polygon mirrors PM, and four laser diodes (LDs) (not shown). The charge units, the development units 5, the primary transfer units 3, the cleaning units, and the discharge units are arranged along respective circumferential regions of the photoconductive drums 2. The photoconductive drums 2 are sequentially arranged along the intermediate transfer belt 12 in contact therewith.

The primary transfer units 3 include respective rollers sequentially arranged along the intermediate transfer belt 12 in contact therewith, and are located in respective positions opposing the respective photoconductive drums 2. The intermediate transfer belt 12 is stretched around the plurality of drive rollers 4 for driving the intermediate transfer belt 12 to move in a direction of an arrow B.

The four LDs emit four laser beams, which pass through the respective optical systems 11, incident on the photoconductive drums 2. The four laser beams form respective latent images on the photoconductor drums 2K, 2C, 2Y, and 2M for black, cyan, yellow, and magenta.

The latent images formed on the respective photoconductive drums 2 are developed into corresponding toner images. The toner images formed on the respective photoconductive drums 2 are sequentially transferred onto the intermediate transfer belt 12 by the respective primary transfer units 3 when the intermediate transfer belt 12 sequentially passes between the photoconductive drums 2 and the primary transfer units 3, and are sequentially superimposed thereon. As a result, a synthetic full color toner image is formed on the intermediate transfer belt 12.

The full color toner image on the intermediate transfer belt 12 is then transferred by he secondary transfer unit 7 onto a recording medium S supplied by the registration rollers 8.

The transferred full color toner image is fixed onto the recording medium S by the fixing unit 9. The recording medium S having the fixed full color image is discharged by the sheet discharge rollers 10.

Since the above configuration of the color image forming apparatus 200 and an electrophotographic method adopted thereby are known, detailed explanations are omitted.

In the color image forming apparatus 200, when a start switch of an operation unit (not shown) is turned on, or when a print job start signal is supplied by a host apparatus connected to the color image forming apparatus 200, the optical writing unit 1 emits the laser beams so that the photoconductive drums 2 are irradiated therewith.

Figure 3:
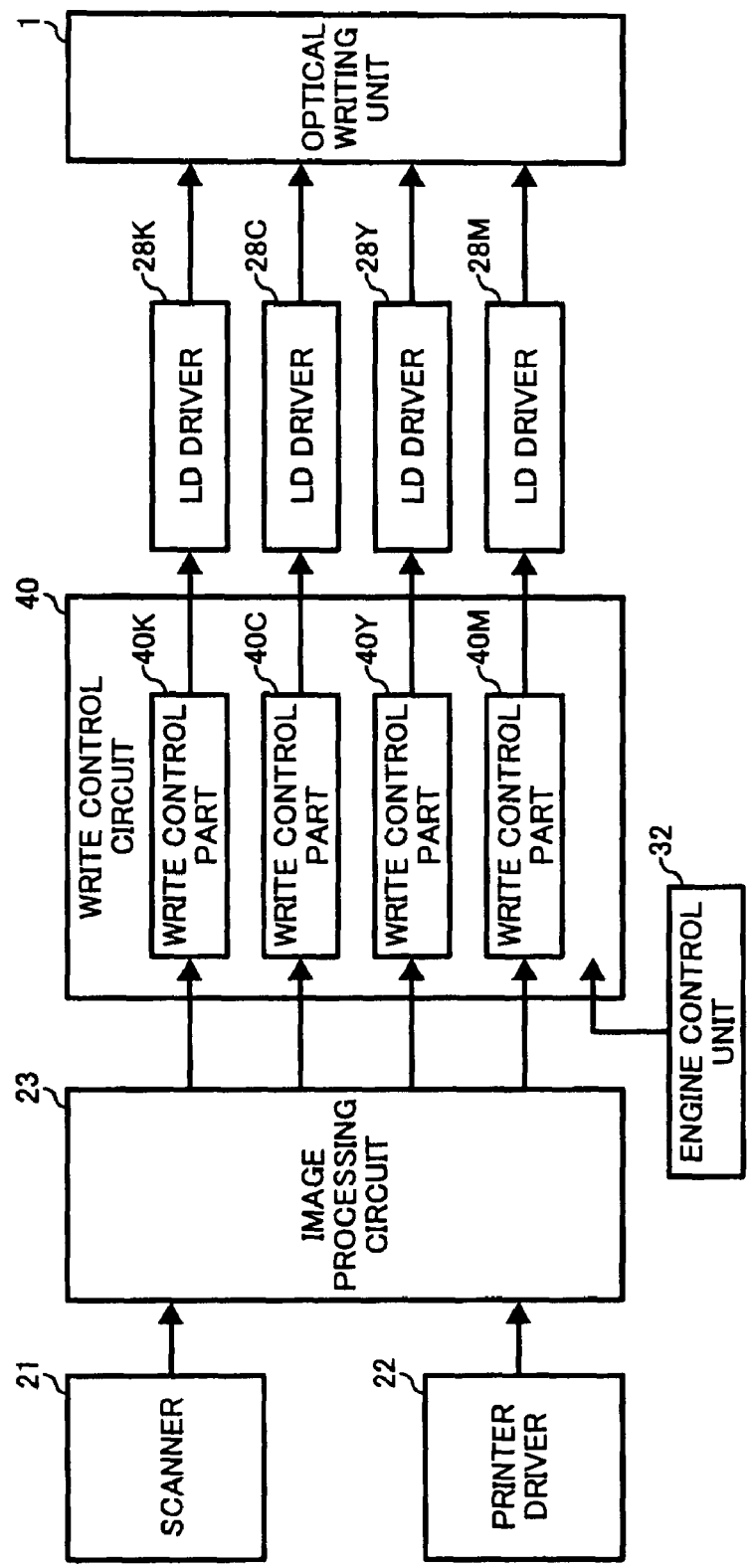
FIG. 3 is a block diagram for explaining a configuration of a write control circuit of the color image forming apparatus shown in FIG. 2.

FIG. 3 is a block diagram for explaining a configuration of a write control circuit 40 of the color image forming apparatus 200. As shown in FIG. 3, the color image forming apparatus 200 further includes the scanner 21, the printer driver 22, and the image processing circuit 23 as in the background color image forming apparatus 100. The color image forming apparatus 200 further includes an engine control unit 32 such as a CPU, the write control circuit 40, and LD drivers 28K, 28C, 28Y, and 28M.

The write control circuit 40 includes four write control parts for the respective colors, 40K, 40C, 40Y, and 40M. The four write control parts 40K, 40C, 40Y, and 40M have different configurations dedicated to the respective colors. Further, the write control parts 40K, 40C, 40Y, and 40M are connected to respective LD drivers 28K, 28C, 28Y, and 28M.

The write control parts 40K, 40C, 40Y, and 40M receive synchronization detection signals from the optical writing unit 1, and determine timing for starting main scanning based on which laser beams are emitted.

The write control parts 40K, 40C, 40Y, and 40M receive image data from the image processing circuit 23, and develop the image data so that two dimensional images are generated therefrom. The write control parts 40K, 40C, 40Y, and 40M output the developed image data to the respective LD drivers 28K, 28C, 28Y, and 28M after converting the image data into a format in accordance with specifications of the LD drivers 28K, 28C, 28Y, and 28M.

The LD drivers 28K, 28C, 28Y, and 28M drive the respective laser diodes of the optical writing unit 1 according to the input image data. As a result, laser light is emitted so that the photoconductive drums 2K, 2Y, 2C, and 2M are irradiated therewith, and electrostatic latent images are formed thereon.

The write control parts 40K, 40C, 40Y, and 40M are provided with only those functions related to the respective colors. For example, the write control part 40K includes a jaggy correction function (described later in further detail) while the other write control parts 40C, 40Y, and 40M do not include the jaggy correction function. Further, only the write control part 40Y includes a forgery prevention function for writing a pattern for preventing forgery.

It is preferable that at least two of the write control parts 40K, 40C, 40Y, and 40M are mounted on the same semiconductor chip. Of course, all the write control parts 40K, 40C, 40Y, and 40M may be mounted on the same semiconductor chip. When a plurality of the write control parts 40K, 40C, 40Y, and 40M are mounted on the same semiconductor chip, a common function can be mounted on the semiconductor chip.

For example, the above-mentioned function for managing writing timing for the respective colors can be mounted on the semiconductor chip including the plurality of write control parts.

In the embodiment, since write control circuits for a plurality of colors are mounted on one chip, a function specific to one of the image forming colors is provided to one of image development parts supporting the one of the image forming colors. Therefore, functional distribution among the write control circuits may be optimized, and a reduction in the number of functions results in cost reduction.

Figure 4:
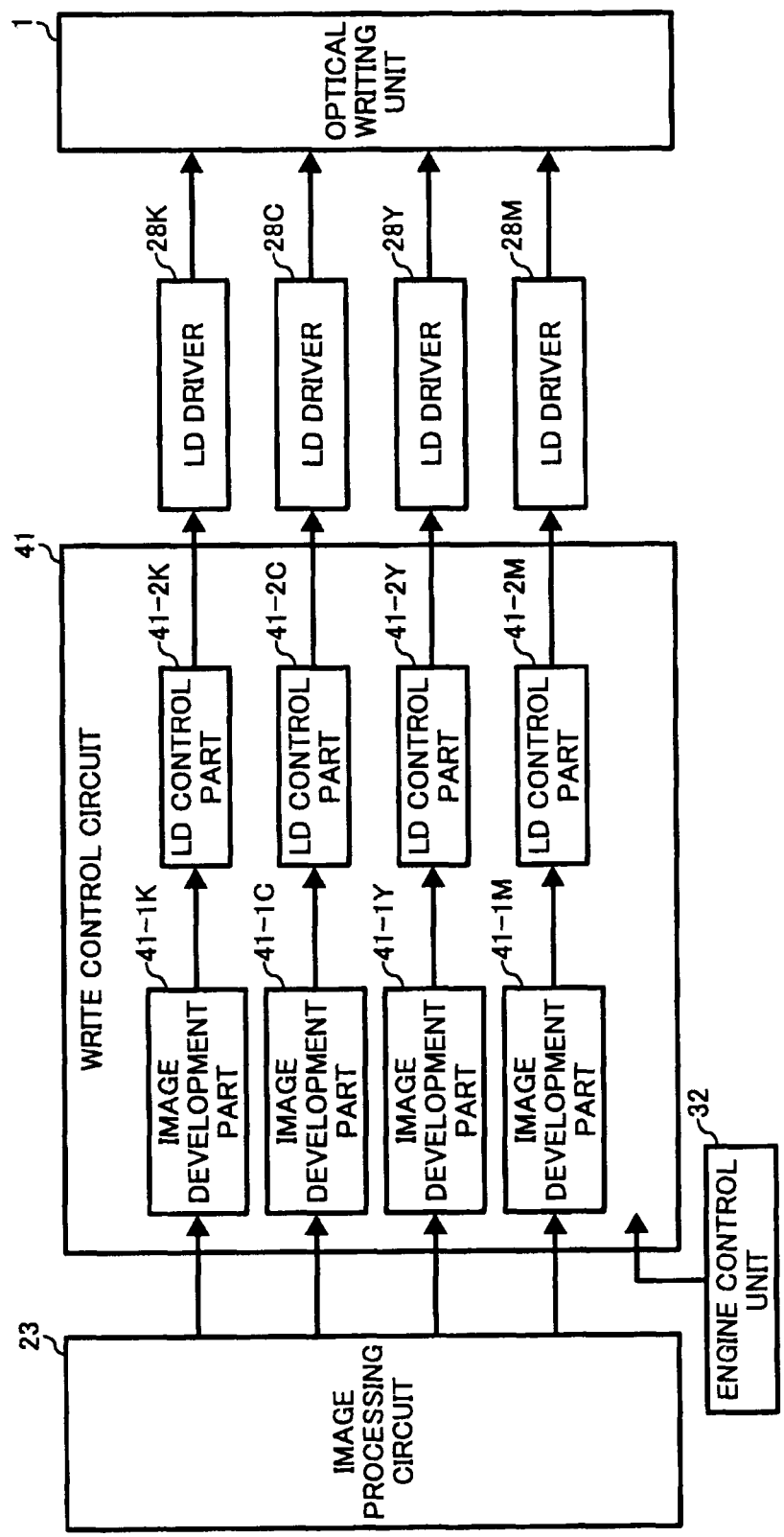
FIG. 4 is a block diagram for explaining a configuration of a write control circuit according to another embodiment of the present invention.

FIG. 4 is a block diagram for explaining a configuration of a write control circuit 41 according to another embodiment of the present invention. In the embodiment, the color image forming apparatus 200 includes the write control circuit 41 instead of the write control circuit 40 in the embodiment described above referring to FIG. 3. The engine control unit 32 provides the write control circuit 41 with control information.

As shown in FIG. 4, the write control circuit 41 includes image development parts 41-1K, 41-1C, 41-1Y, and 41-1M for developing and processing image data of the respective colors received from the image processing circuit 23. The write control circuit 41 further includes LD control parts 41-2K, 41-2C, 41-2Y, and 41-2M corresponding to the respective image development parts. The image development parts 41-1K, 41-1C, 41-1Y, and 41-1M are connected to the LD control parts 41-2K, 41-2C, 41-2Y, and 41-2M, respectively. Further, the LD control parts 41-2K, 41-2C, 41-2Y, and 41-2M are connected to the LD drivers 28K, 28C, 28Y, and 28M, respectively, and output control signals to the LD drivers 28K, 28C, 28Y, and 28M, respectively to control the LD drivers 28K, 28C, 28Y, and 28M, respectively. The LD drivers 28K, 28C, 28Y, and 28M receive the output control signals from the LD control parts 41-2K, 41-2C, 41-2Y, and 41-2M, respectively to drive the respective laser diodes in the optical writing unit 1 as in the embodiment described above referring to FIG. 3 so that the photoconductive drums 2K, 2C, 2Y and 2M are irradiated with modulated laser light.

The configuration of the write control circuit 41 according to the embodiment is suitable for the color image forming apparatus 200 when the color image forming apparatus 200 is a low speed apparatus that performs writing by using one laser diode for each of the four colors, K, C, Y, and M. In that case, the configuration of the write control circuit 41 allows driving of a maximum of four laser diodes in total as one light source is driven for each of the four colors.

Explanations of the same configuration and functions as the configuration and functions in the embodiment described above referring to FIG. 3 are omitted.

Figure 5:
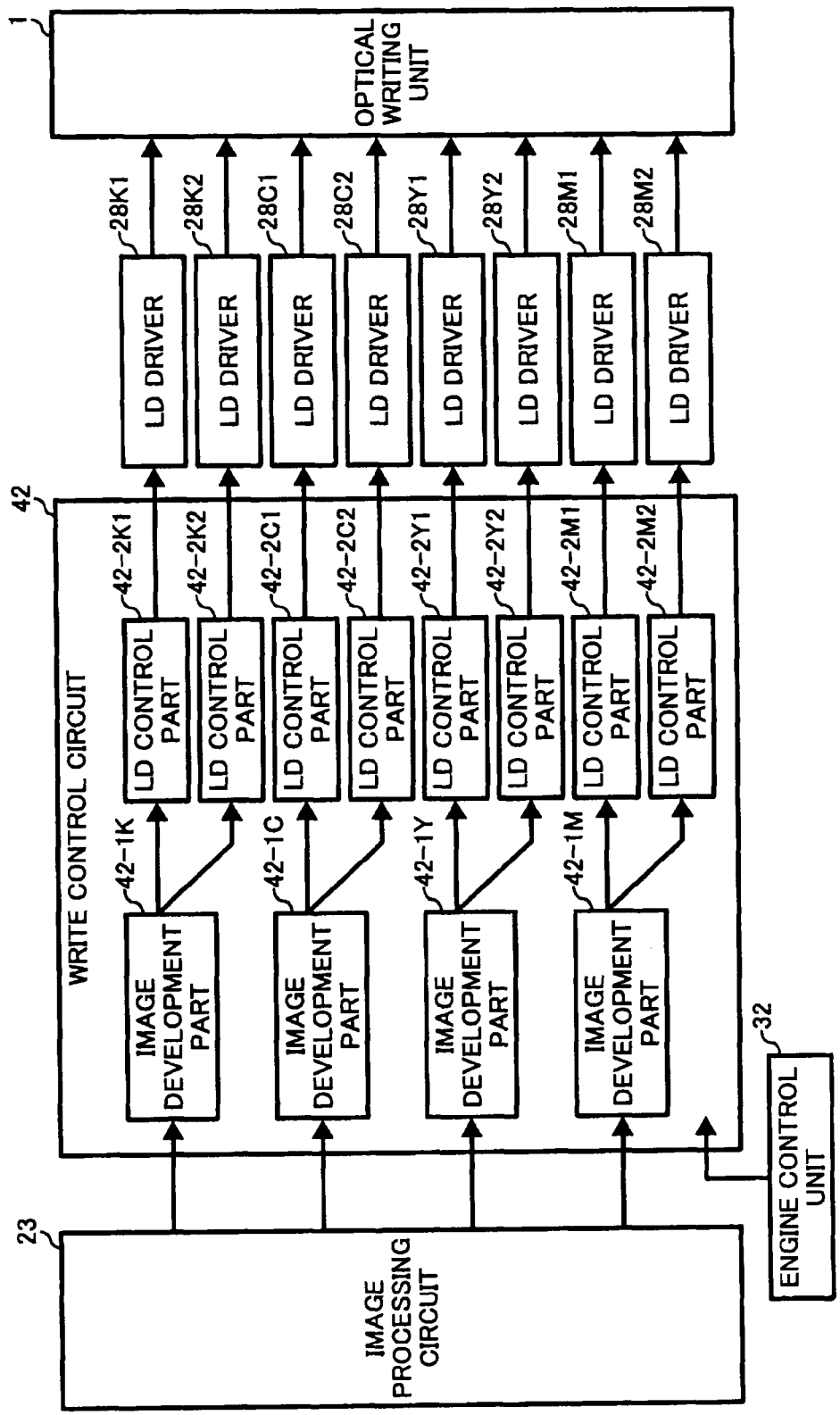
FIG. 5 is a block diagram for explaining a configuration of a write control circuit according to another embodiment of the present invention.

FIG. 5 is a block diagram for explaining a configuration of a write control circuit 42 according to another embodiment of the present invention. In the embodiment, the color image forming apparatus 200 includes the write control circuit 42 and LD drivers 28K1, 28K2, 28C1, 28C2, 28Y1, 28Y2, 28M1, and 28M2 instead of the write control circuit 40 and the LD drivers 28K, 28C, 28Y, and 28M in the embodiment described above referring to FIG. 3. The engine control unit 32 provides the write control circuit 42 with control information. The configuration shown in FIG. 5 is suitable for image forming at increased speed, and sharing of a write control circuit among a plurality of models.

As shown in FIG. 5, the write control circuit 42 includes image development parts 42-1K, 42-1C, 42-1Y, and 42-1M for developing and processing image data of the respective colors received from the image processing circuit 23. The write control circuit 42 further includes LD control parts 42-2K1, 42-2K2, 42-2C1, 42-2C2, 42-2Y1, 42-2Y2, 42-2M1, and 42-2M2 corresponding to the respective image development parts 42-1K, 42-1C, 42-1Y, and 42-1M. The image development part 42-1K is connected to the LD control parts 42-2K1 and 42-2K2. The image development part 42-1C is connected to the LD control parts 42-2C1 and 42-2C2. The image development part 42-1Y is connected to the LD control parts 42-2Y1 and 42-2Y2. The image development part 42-1M is connected to the LD control parts 42-2M1 and 42-2M2. The LD control parts 42-2K1, 42-2K2, 42-2C1, 42-2C2, 42-2Y1, 42-2Y2, 42-2M1, and 42-2M2 are connected to the LD drivers 28K1, 28K2, 28C1, 28C2, 28Y1, 28Y2, 28M1, and 28M2, respectively, with a one-to-one correspondence. In the embodiment, two laser diodes are provided for each of the four colors, K, C, Y, and M. The configuration of the write control circuit 42 allows driving of a maximum of eight laser diodes in total as two light sources are driven for each of the four colors. The LD drivers 28K1, 28K2, 28C1, 28C2, 28Y1, 28Y2, 28M1, and 28M2 receive output control signals from the LD control parts 42-2K1, 42-2K2, 42-2C1, 42-2C2, 42-2Y1, 42-2Y2, 42-2M1, and 42-2M2, respectively to drive the respective laser diodes in the optical writing unit 1 as in the embodiment described above referring to FIG. 3 so that the photoconductive drums 2K, 2C, 2Y and 2M are irradiated with modulated laser light.

The number of colors in which the color image forming apparatus 200 are able to form images is not limited to four. Alternatively, when m represents the number of colors, in other words, when m represents the number of image development parts included in the write control circuit 42, and n represents the number of light sources provided for each of the colors, m*n represents the maximum number of laser diodes which the write control circuit 42 may drive. The configuration in the embodiment allows driving of light sources by a number twice the number of light sources allowed in the embodiment described above referring to FIG. 4, resulting in a corresponding increase in image forming speed.

When the image forming apparatus 200 performs writing by using one laser diode for each of the four colors, K, C, Y, and M, the write control circuit 42 may be used with only four of the eight LD drivers. Therefore, the write control circuit 42 in the embodiment may be applied not only to an image forming apparatus having a relatively large number of laser diodes, but also to an image forming apparatus having a relatively small number of laser diodes.

Figure 6:
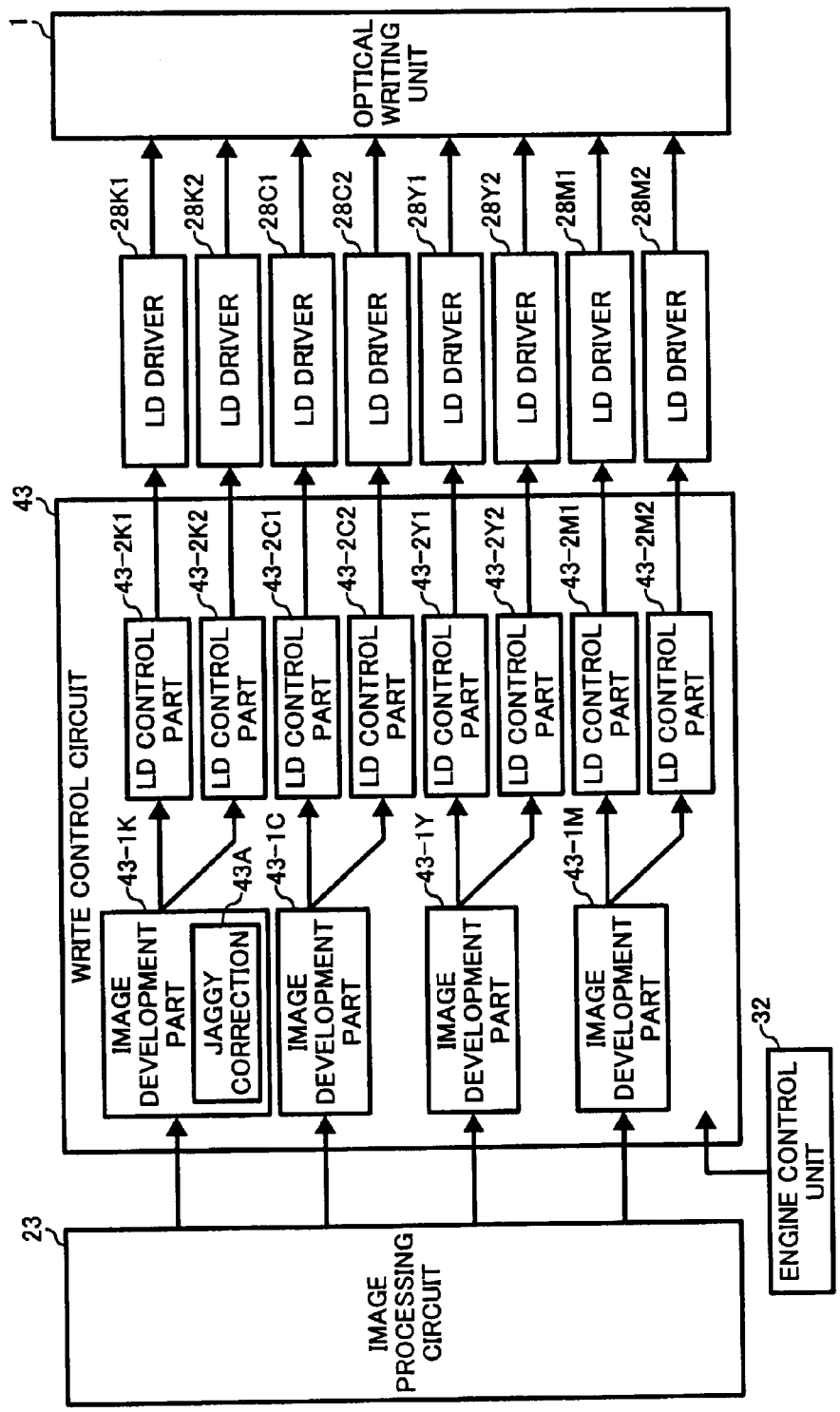
FIG. 6 is a block diagram for explaining a configuration of a write control circuit according to another embodiment of the present invention.

FIG. 6 is a block diagram for explaining a configuration of a write control circuit 43 according to another embodiment of the present invention. In the embodiment, the configuration shown in FIG. 6 is the same as the configuration shown in FIG. 5 except that the image forming apparatus 200 includes the write control circuit 43 instead of the write control circuit 42. The engine control unit 32 provides the write control circuit 43 with control information. The write control circuit 43 includes image development parts 43-1K, 43-1C, 43-1Y, and 43-1M for developing and processing image data of the respective colors received from the image processing circuit 23. The image development parts 43-1K, 43-1C, 43-1Y, and 43-1M have respective functions specific to the respective colors. The write control circuit 43 further includes LD control parts 43-2K1, 43-2K2, 43-2C1, 43-2C2, 43-2Y1, 43-2Y2, 43-2M1, and 43-2M2. The LD control parts 43-2K1, 43-2K2, 43-2C1, 43-2C2, 43-2Y1, 43-2Y2, 43-2M1, and 43-2M2 have the same configurations for all the colors.

As in the embodiment described above referring to FIG. 5, each of the image development parts 43-1K, 43-1C, 43-1Y, and 43-1M are connected to two of the LD control parts. In detail, the image development part 43-1K is connected to the LD control parts 43-2K1 and 43-2K2. The image development part 43-1C is connected to the LD control parts 43-2C1 and 43-2C2. The image development part 43-1Y is connected to the LD control parts 43-2Y1 and 43-2Y2. The image development part 43-1M is connected to the LD control parts 43-2M1 and 43-2M2. Further, the LD control parts 43-2K1, 43-2K2, 43-2C1, 43-2C2, 43-2Y1, 43-2Y2, 43-2M1, and 43-2M2 are connected to the LD drivers 28K1, 28K2, 28C1, 28C2, 28Y1, 28Y2, 28M1, and 28M2, respectively with a one-to-one correspondence.

In the embodiment, two laser diodes are provided for each of the four colors, K, C, Y, and M. The configuration of the write control circuit 43 allows driving of a maximum of eight laser diodes in total as two light sources are driven for each of the four colors. The LD drivers 28K1, 28K2, 28C1, 28C2, 28Y1, 28Y2, 28M1, and 28M2 receive output control signals from the LD control parts 43-2K1, 43-2K2, 43-2C1, 43-2C2, 43-2Y1, 43-2Y2, 43-2M1, and 43-2M2, respectively to drive the respective laser diodes in the optical writing unit 1 as in the embodiment described above referring to FIG. 5 so that the photoconductive drums 2K, 2C, 2Y and 2M are irradiated with modulated laser light.

The configuration of the write control circuit 43 in which color-specific functions are allocated to the image development parts allows functional specialization. In addition, the LD control parts 43-2K1 to 43-2M2 have common specifications. Therefore, the write control circuit 43 may be efficiently developed.

Further, as shown in FIG. 6, the image development part 43-1K includes a jaggy correction function 43A while the other image development parts 43-1C, 43-1Y, and 43-1M do not include the jaggy correction function 43A.

The jaggy correction function 43A is a technique used for forming a monochrome image. For example, when original image data having a relatively low resolution of 100 dpi, 200 dpi, 300 dpi, or the like is received via facsimile, the image data needs to be converted into image data having a relatively high resolution of 600 dpi, 1200 dpi, or the like for recording. When the number of pixels in the original image data is increased simply according to a scaling factor, an edge portion of an image such as a slant line appears as a jaggy line. Therefore, a particular pattern such as the slant line needs to be detected, and smoothing needs to be performed thereon. The jaggy correction function 43A performs the detection and smoothing.

The image development part 43-1K for black having the jaggy correction function 43A may be developed separately from the other image development parts 43-1C, 43-1Y, and 43-1M for the other colors. Since the other image development parts 43-1C, 43-1Y, and 43-1M need not to have the jaggy correction function 43A, functional optimization may be achieved.

Figure 7:
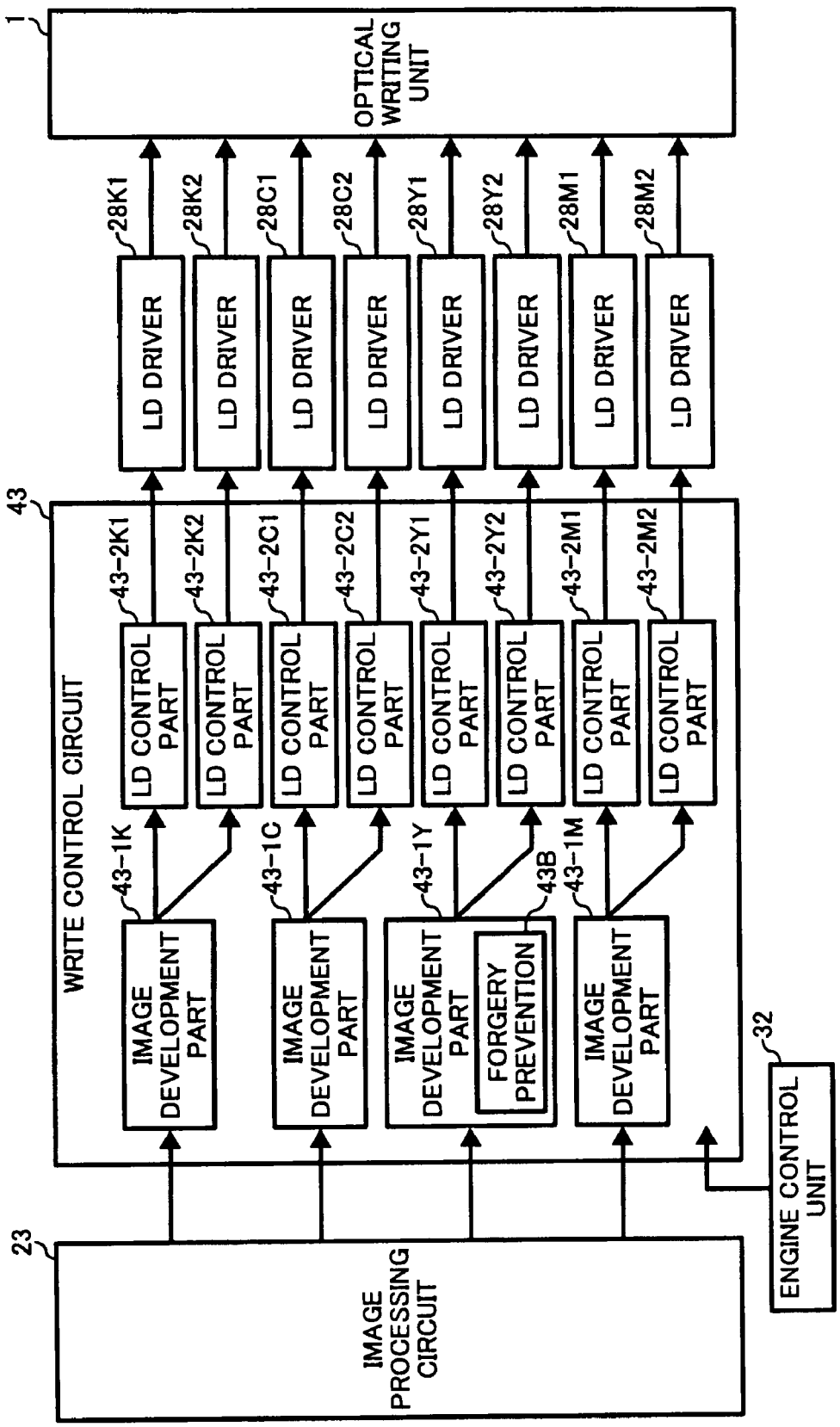
FIG. 7 is a block diagram for explaining another configuration of the write control circuit shown in FIG. 6.

Alternatively, the write control circuit 43 may be configured as shown in FIG. 7. FIG. 7 is a block diagram for explaining another configuration of the write control circuit 43. As shown in FIG. 7, the image development part 43-1K may not include the jaggy correction function 43A, while the image development part 43-1Y may include a forgery prevention function 43B for writing a pattern for preventing forgery. Since the other image development parts 43-1K, 43-1C, and 43-1M need not to have the forgery prevention function 43B, functional optimization may be achieved.

Figure 8:
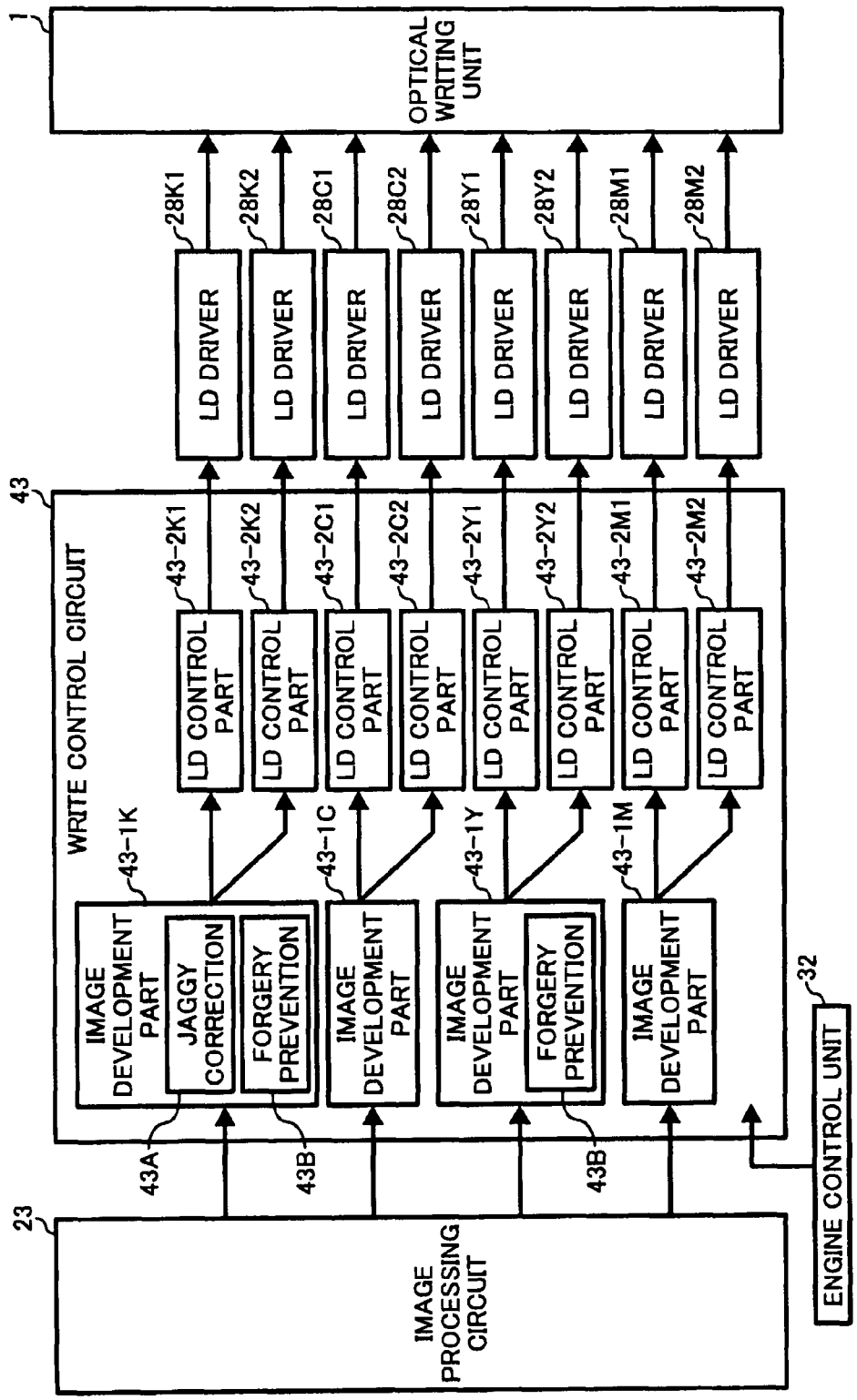
FIG. 8 is a block diagram for explaining another configuration of the write control circuit shown in FIG. 6.

Alternatively, the write control circuit 43 may be configured as shown in FIG. 8. FIG. 8 is a block diagram for explaining another configuration of the write control circuit 43. As shown in FIG. 8, the image development part 43-1K may include both the jaggy correction function 43A and the forgery prevention function 43B, and the image development part 43-1Y may include the forgery prevention function 43B. In the embodiment, the image development part 43-1K for black includes all the functions to be used for any one of the colors.

As described above, in the case in which one of the image development parts of the write control circuit includes functions supporting a plurality of colors, the write control circuit may be included in a plural number in one image forming apparatus so that one of the write control circuits is used for writing in monochrome image forming and the other write control circuits are used for writing in image forming with the other colors.

Figure 9:
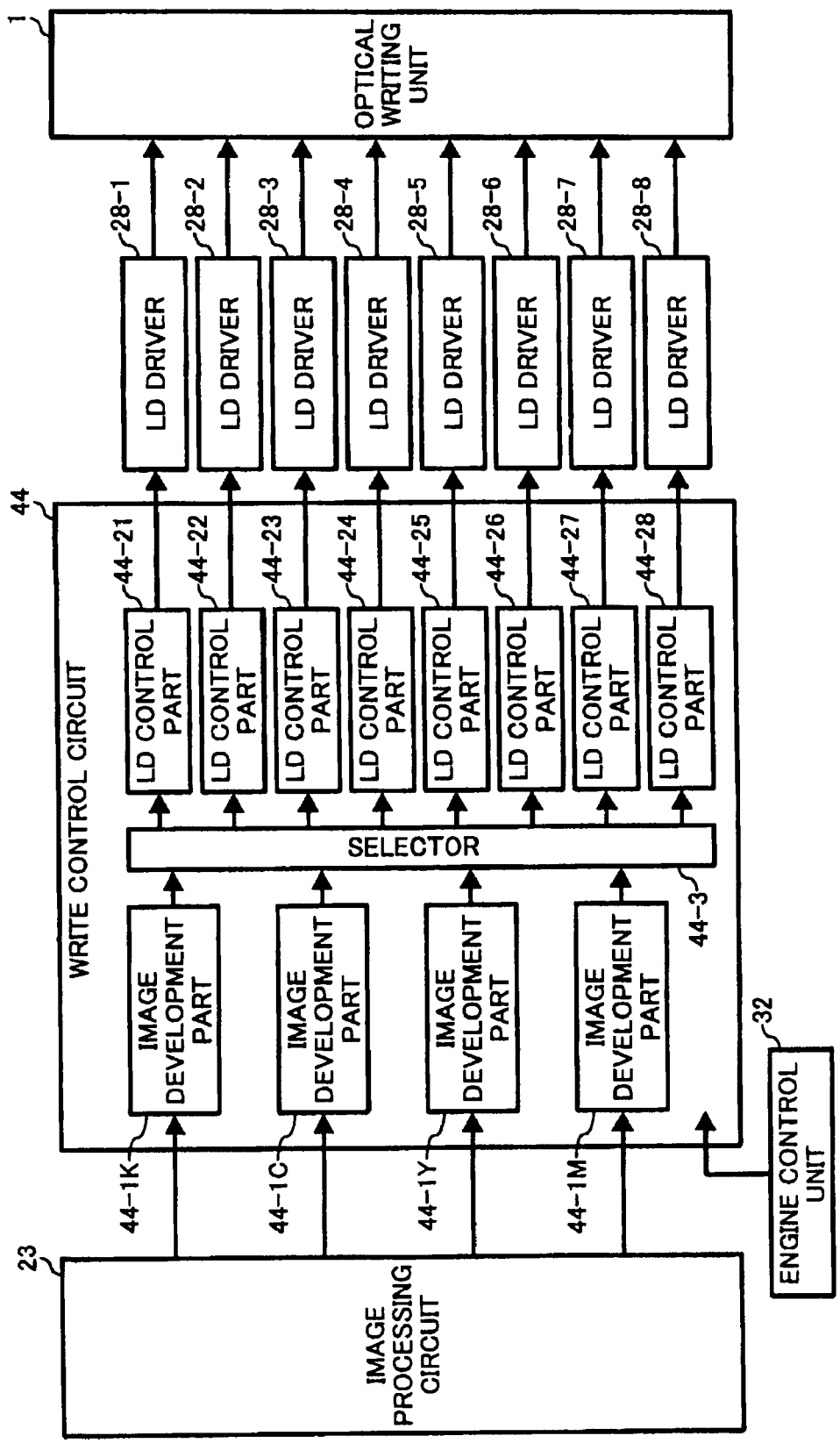
FIG. 9 is a block diagram for explaining a configuration of a write control circuit according to another embodiment of the present invention.

FIG. 9 is a block diagram for explaining a configuration of a write control circuit 44 according to another embodiment of the present invention. In the embodiment, the color image forming apparatus 200 includes the write control circuit 44 and LD drivers 28-1, 28-2, 28-3, 28-4, 28-5, 28-6, 28-7, and 28-8 having the same configurations and functions instead of the write control circuit 43 and the LD drivers 28K1, 28K2, 28C1, 28C2, 28Y1, 28Y2, 28M1, and 28M2 described above referring to FIG. 6. The engine control unit 32 provides the write control circuit 44 with control information. The write control circuit 44 includes image development parts 44-1K, 44-1C, 44-1Y, and 44-1M for developing and processing image data of the respective colors received from the image processing circuit 23, and LD control parts 44-21, 44-22, 44-23, 44-24, 44-25, 44-26, 44-27, and 44-28. The number of the LD control parts is twice the number of the image development parts.

The write control circuit 44 further includes a selector 44-3 arranged between the image development parts 44-1K, 44-1C, 44-1Y, and 44-1M, and the LD control parts 44-21, 44-22, 44-23, 44-24, 44-25, 44-26, 44-27, and 44-28 for switching connections therebetween. The selector 44-3 switches the connections so that image data for the four colors from the image development parts 44-1K, 44-1C, 44-1Y, and 44-1M can be sent to any of the eight LD control parts 44-21, 44-22, 44-23, 44-24, 44-25, 44-26, 44-27, and 44-28. The engine control unit 32 controls the switching performed by the selector 44-3. The LD control parts 44-21, 44-22, 44-23, 44-24, 44-25, 44-26, 44-27, and 44-28 are connected to the LD drivers 28-1, 28-2, 28-3, 28-4, 28-5, 28-6, 28-7, and 28-8, respectively, with a one-to-one correspondence.

In the embodiment, since the engine control unit 32 controls the switching performed by the selector 44-3, the write control circuit 44 may be used in a plurality of models for a general-purpose.

Figure 10:
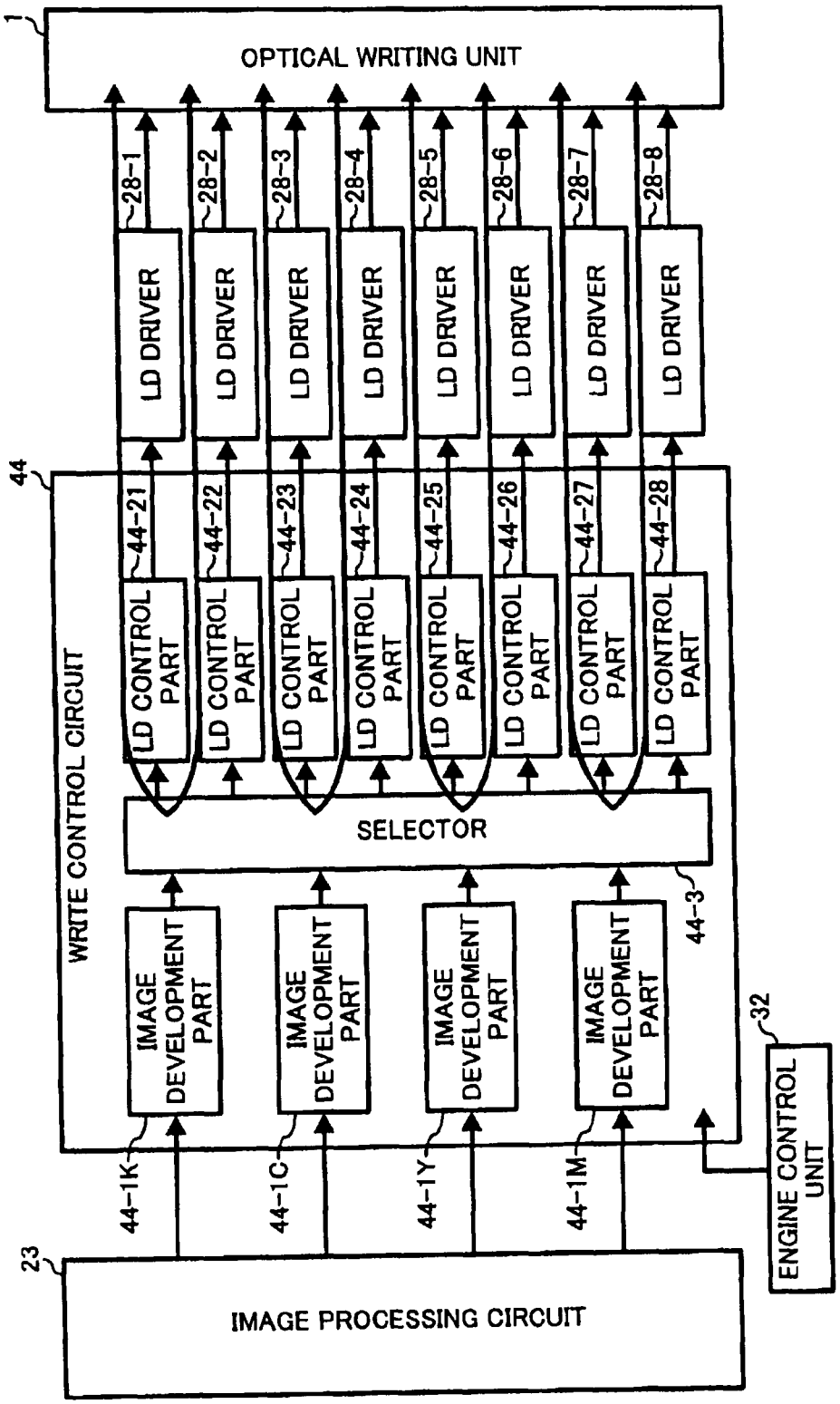
FIG. 10 is a block diagram for explaining an operation of the write control circuit shown in FIG. 9.

FIG. 10 is a block diagram for explaining an operation of the write control circuit 44 according to the embodiment of the present invention described above referring to FIG. 9. As understood from FIG. 10, the write control circuit 44 is configured to use two laser diodes for each of the colors. Therefore, the selector 44-3 switches connections so that image data for each of the colors received from each of the image development parts 44-1K, 44-1C, 44-1Y, and 44-1M are sent to two of the LD control parts 44-21, 44-22, 44-23, 44-24, 44-25, 44-26, 44-27, and 44-28. In detail, an output from the image development part 44-1K is sent to the LD control parts 44-21 and 44-22. An output from the image development part 44-1C is sent to the LD control parts 44-23 and 44-24. An output from the image development part 44-1Y is sent to the LD control parts 44-25 and 44-26. An output from the image development part 44-1M is sent to the LD control parts 44-27 and 44-28.

The above operation allows the color image forming apparatus 200 to be configured with the single write control circuit 44 when the color image forming apparatus 200 is a medium speed model.

Figure 11:
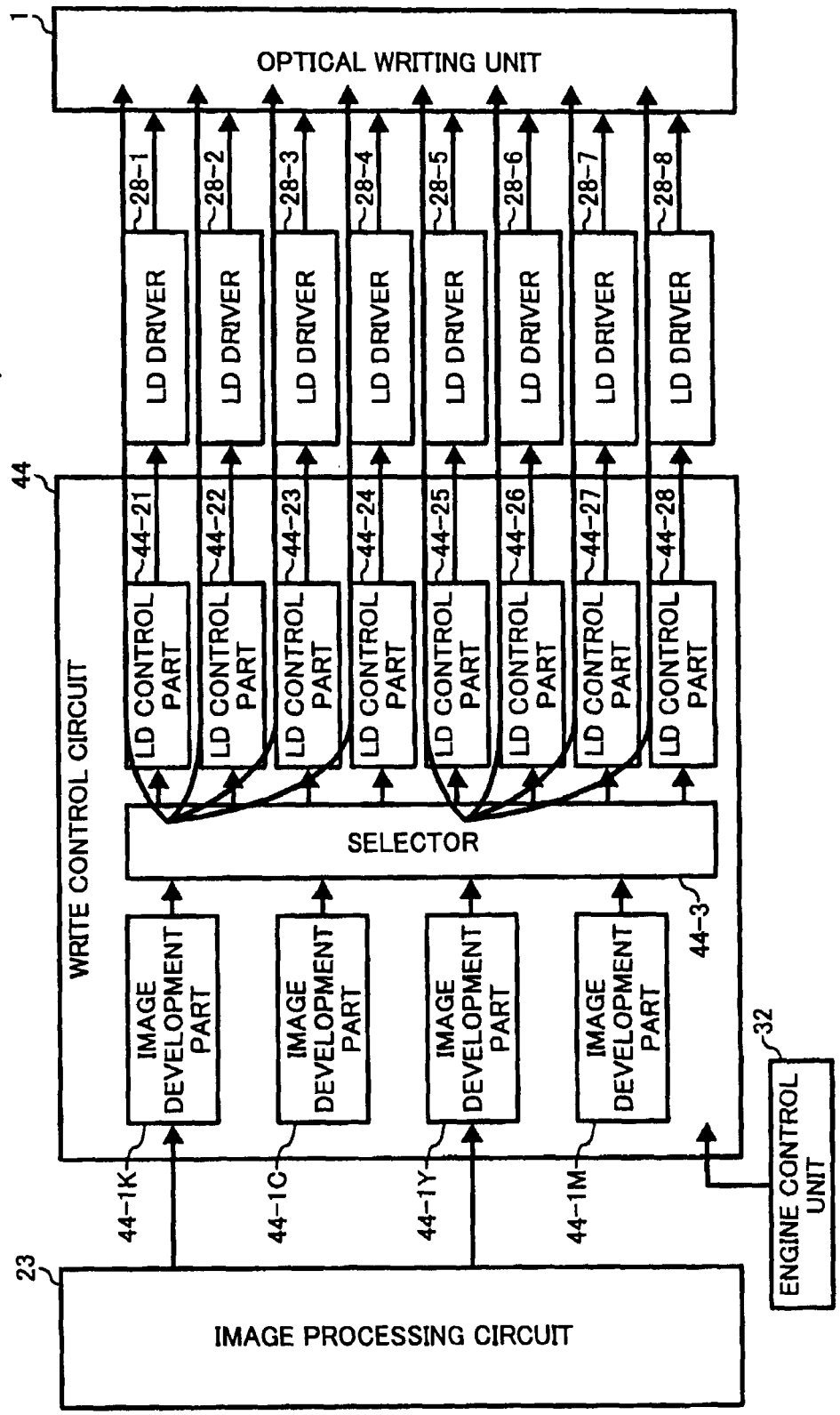
FIG. 11 is a block diagram for explaining another operation of the write control circuit shown in FIG. 9.

FIG. 11 is a block diagram for explaining another operation of the write control circuit 44 according to the embodiment of the present invention described above referring to FIG. 9. In the case shown in FIG. 11, the write control circuit 44 is included in an image forming apparatus 300 for forming a bicolor image.

In general, a bicolor image forming apparatus satisfactorily includes image development parts for two colors. However, it is beneficial to cause the write control circuit 44 to operate as described below from the viewpoint of using a write control circuit that can be commonly used in a plurality of models.

When the image forming apparatus 300 having the write control circuit 44 forms a bicolor image in black and red, for example, the image development parts 44-1K and 44-1Y for black and yellow develop and process image data for black and red received from the image processing circuit 23. The selector 44-3 switches connections so that each output from the image development parts 44-1K and 44-1Y is sent to respective four of the eight LD control parts. In detail, the output from the image development part 44-1K is sent to the LD control parts 44-21, 44-22, 44-23, and 44-24 connected to the LD drivers 28-1, 28-2, 28-3, and 28-4, respectively. The output from the image development part 44-1Y is sent to the LD control parts 44-25, 44-26, 44-27, and 44-28 connected to the LD drivers 28-5, 28-6, 28-7, and 28-8, respectively.

The write control circuit 44 for performing the above operation may be used in various image forming apparatuses. When writing for one color is performed by using four laser diodes, a high speed operation may be achieved.

Figure 12:
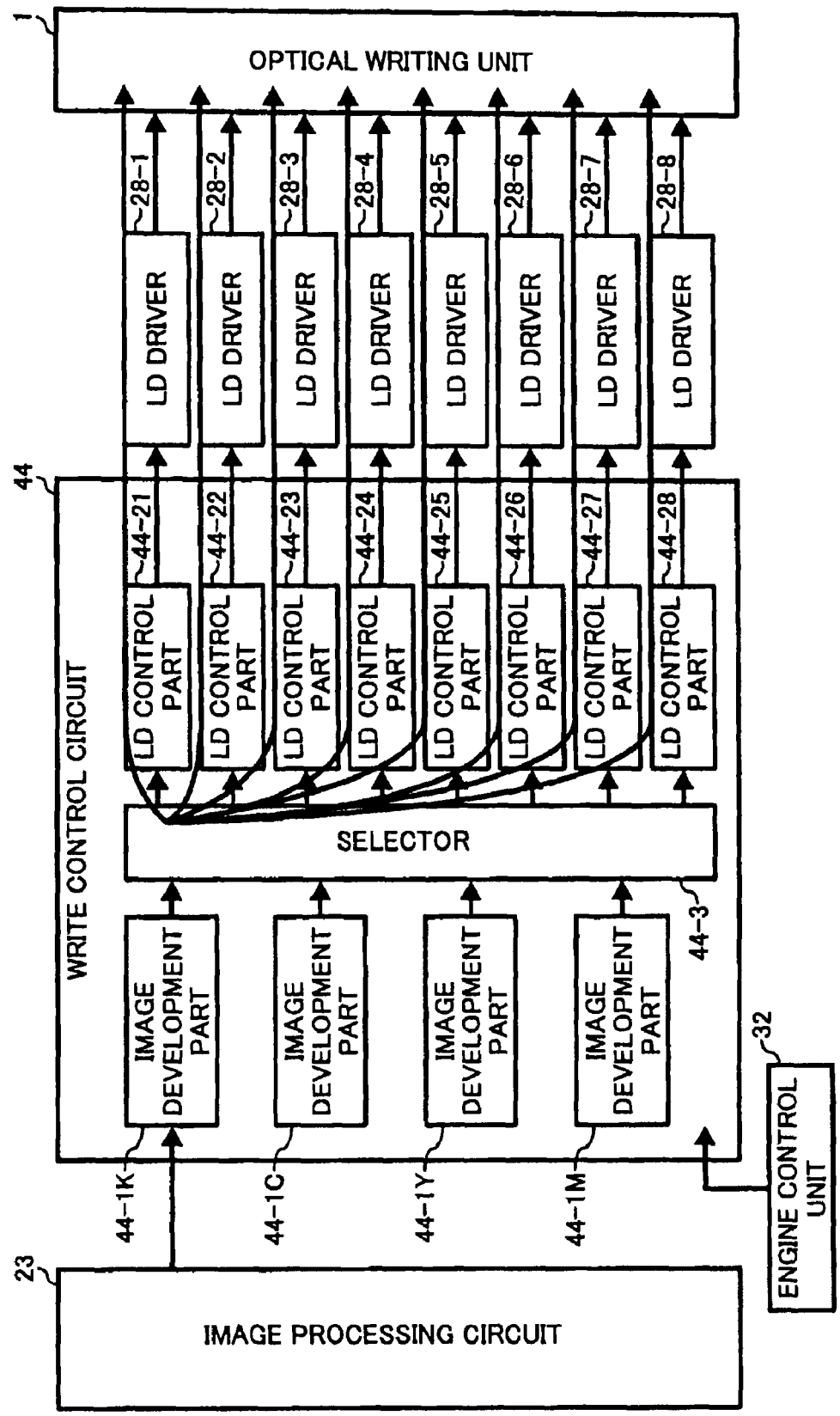
FIG. 12 is a block diagram for explaining another operation of the write control circuit shown in FIG. 9.

FIG. 12 is a block diagram for explaining another operation of the write control circuit 44 according to the embodiment of the present invention described above referring to FIG. 9. In the case shown in FIG. 12, the write control circuit 44 is included in an image forming apparatus 400 for forming a monochrome image.

In general, a monochrome image forming apparatus needs to achieve high productivity. In addition, the monochrome image forming apparatus may need to achieve high resolution and high density. To satisfy those needs, image data from the image processing circuit 23 is input to only the image development part 44-1K for black in the write control circuit 44 as shown in FIG. 12. Further, the selector 44-3 switches connections so that an output from the image development part 44-1K is sent to all of the LD control parts 44-21, 44-22, 44-23, 44-24, 44-25, 44-26, 44-27, and 44-28 to control driving of the LD drivers 28-1, 28-2, 28-3, 28-4, 28-5, 28-6, 28-7, and 28-8, respectively, connected to the LD control parts 44-21, 44-22, 44-23, 44-24, 44-25, 44-26, 44-27, and 44-28, respectively. As a result, all the eight laser diodes are used for forming a black image in the image forming apparatus 300.

In the write control circuit 44 described above referring to FIGS. 9 to 12, the selector 44-3 is capable of switching the connections between the image development parts 44-1K, 44-1C, 44-1Y, and 44-1M, and the LD control parts 44-21, 44-22, 44-23, 44-24, 44-25, 44-26, 44-27, and 44-28 in various ways. However, allowing the selector 44-3 to switch the connections in any conceivable ways generally requires a huge circuit. Therefore, the selector 44-3 needs to be configured to support only such connections that are expected in an actual image forming apparatus as described below so that a circuit configuration of the selector 44-3 can be optimized.

As in the case shown in FIG. 12, the image development part 44-1K for black needs to be connected to all of the LD control parts 44-21, 44-22, 44-23, 44-24, 44-25, 44-26, 44-27, and 44-28 to support high speed monochrome image forming. On the other hand, image development parts 44-1C, 44-1Y, and 44-1M for cyan, yellow, and magenta need not be connected to any of the LD control parts 44-21, 44-22, 44-23, 44-24, 44-25, 44-26, 44-27, and 44-28, because no image forming apparatus needs to form an image in any single color of cyan, yellow, or magenta.

However, as in the case shown in FIG. 11, an image forming apparatus forms a bicolor image by using four laser diodes for each of two colors, and therefore four LD control parts need to be connected for any one of cyan, yellow, and magenta.

Therefore, as shown in FIG. 11, the image development part 44-1Y for yellow is configured such that the image development part 44-1Y may be connected to four LD control parts, which are half the total number of the LD control parts. In detail, the image development part 44-1Y is configured such that the image development part 44-1Y may be connected to the LD control parts 44-25, 44-26, 44-27, and 44-28. The image development parts 44-1C and 44-1M for the other colors are configured such that the respective image development parts 44-1C and 44-1M may be connected to two LD control parts, which are one fourth of the total number of the LD control parts, so that the write control circuit 44 may be used in a full color image forming apparatus.

With the above configuration, the write control circuit 44 may be used in any one of a high-speed monochrome image forming apparatus, a bicolor image forming apparatus, and a medium-speed color image forming apparatus.

Figure 13A:
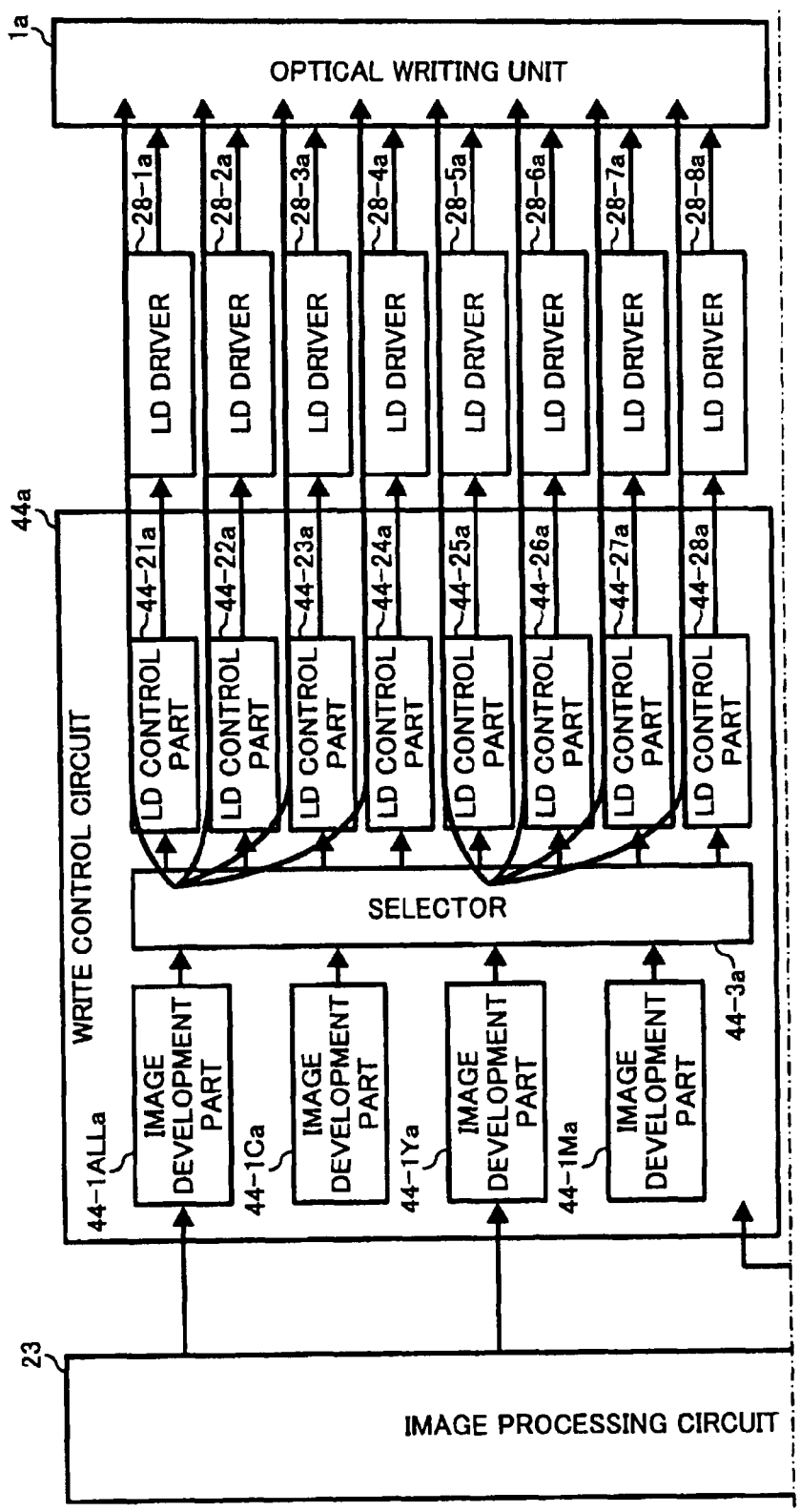
FIGS. 13A, 13B are a block diagram for explaining an exemplary configuration for write control of a color image forming apparatus according to another embodiment of the present invention.
Figure 13B:
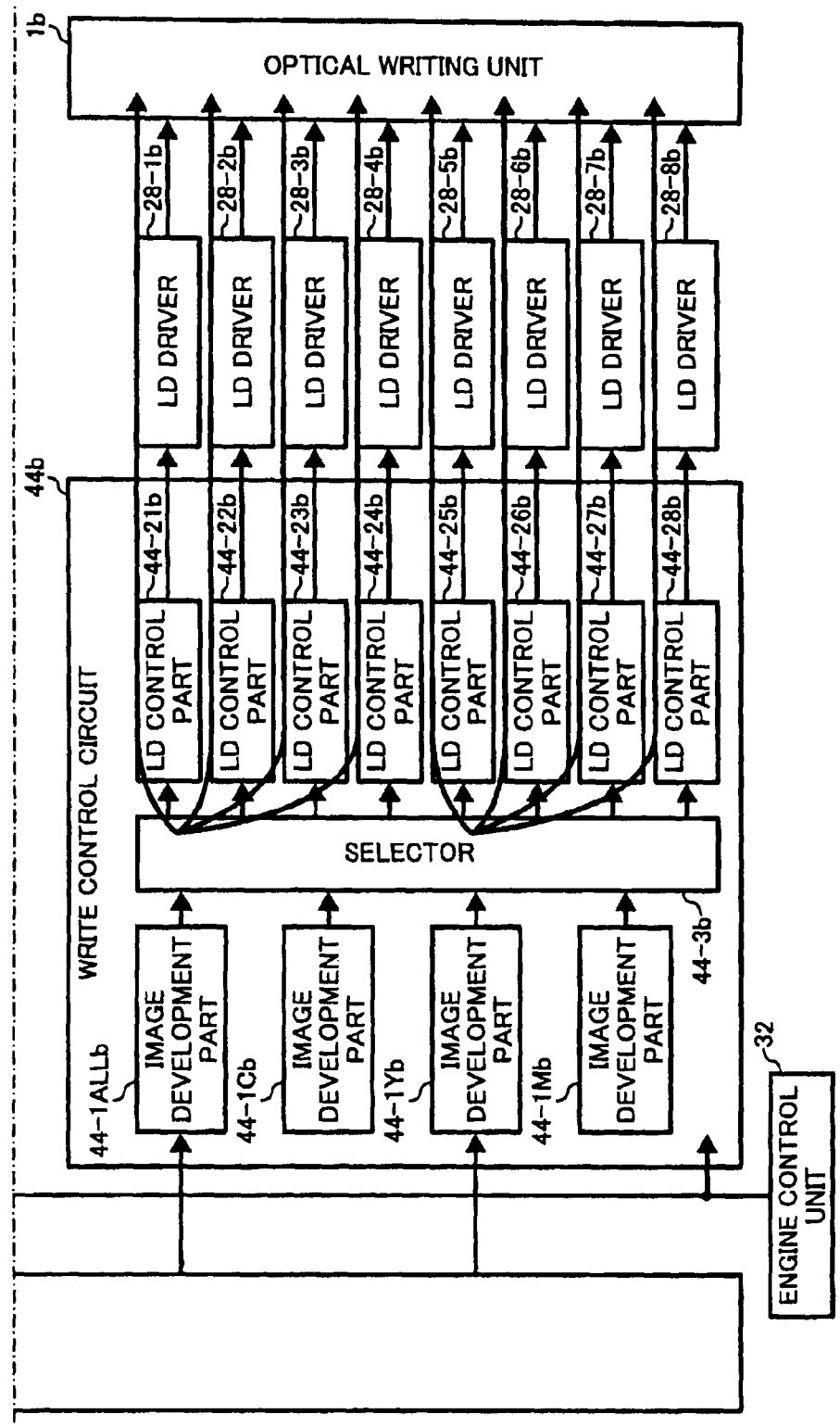
Figure 14B:
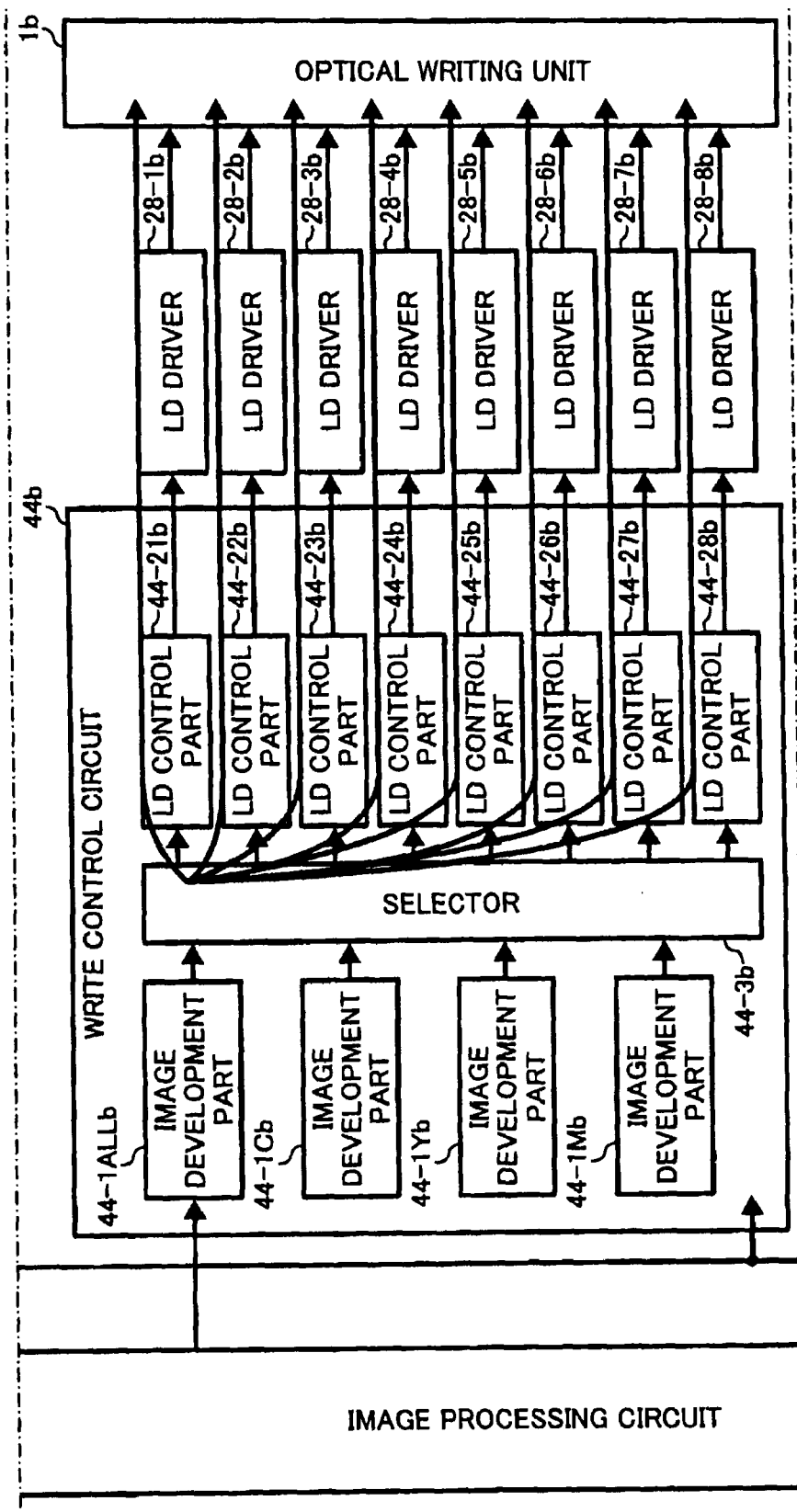
Figure 14C:
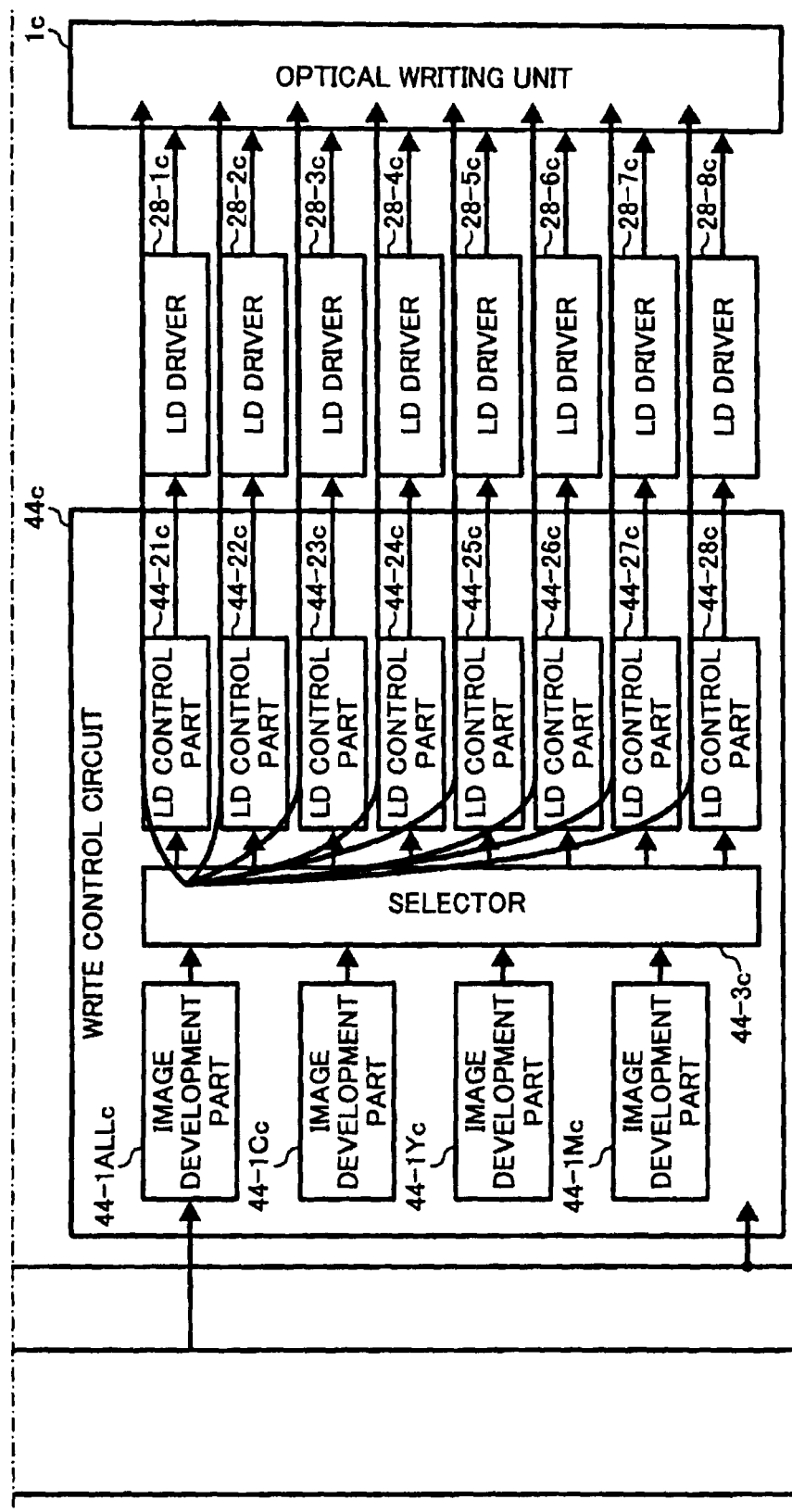
Figure 14D:
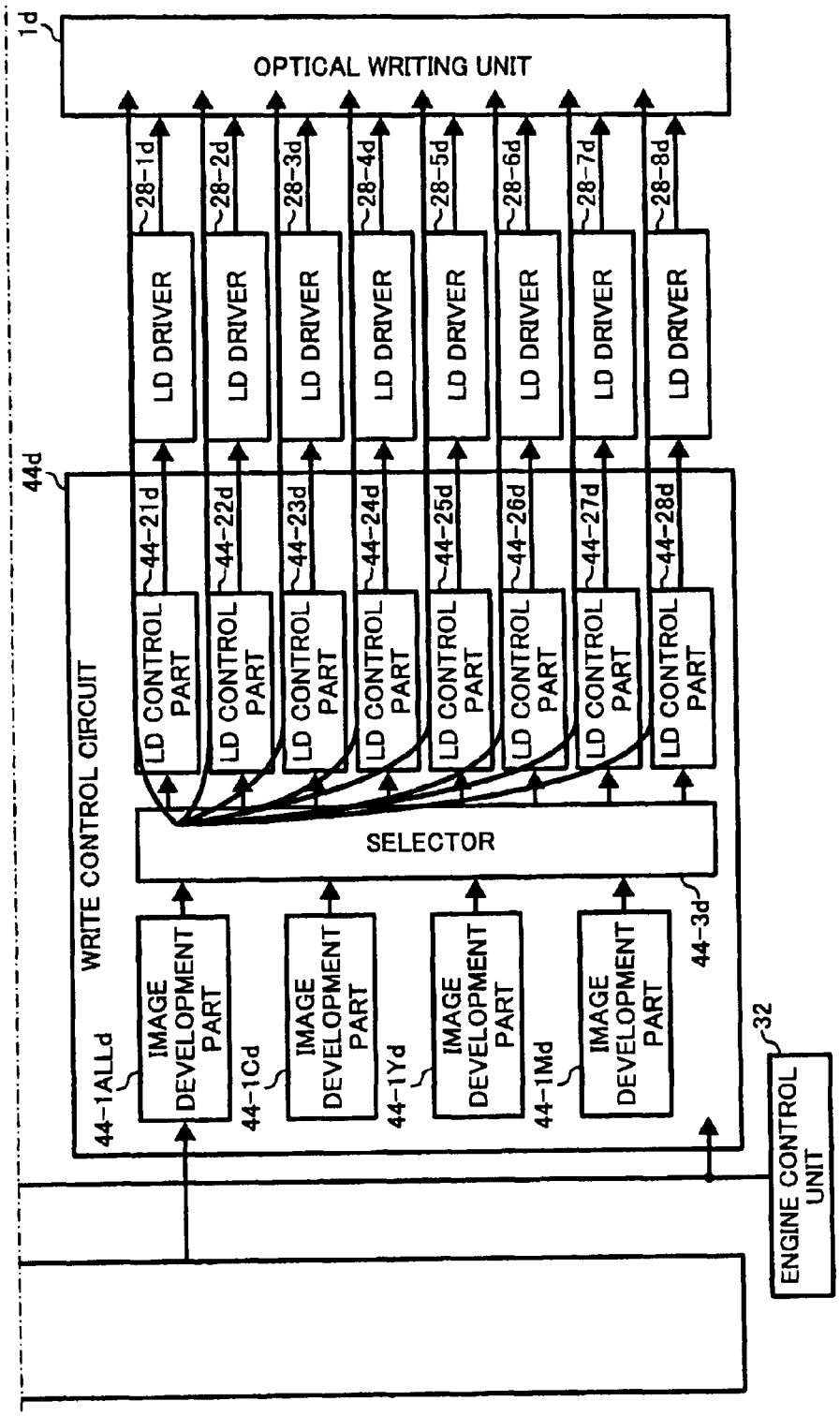

FIGS. 13A, 13B are a block diagram for explaining an exemplary configuration for write control of a color image forming apparatus 500 according to another embodiment of the present invention. The color image forming apparatus 500 forms a full color image by using four laser diodes for each of four colors, namely black, cyan, yellow, and magenta. Therefore, the color image forming apparatus 500 needs 16 LD control parts in total to drive the four laser diodes for each of the four colors.

As shown in FIGS. 13A, 13B, the color image forming apparatus 500 includes a first write control circuit 44a and a second write control circuit 44b instead of the single write control circuit 44 in the cases described above referring to FIGS. 9 to 12. The color image forming apparatus 500 further includes LD drivers 28-1a, 28-2a, 28-3a, 28-4a, 28-5a, 28-6a, 28-7a, 28-8a, 28-1b, 28-2b, 28-3b, 28-4b, 28-5b, 28-6b, 28-7b, and 28-8b, instead of the LD drivers 28-1, 28-2, 28-3, 28-4, 28-5, 28-6, 28-7, and 28-8 described above referring to FIGS. 9 to 12. The color image forming apparatus 500 further includes optical writing units 1a and 1b each having eight laser diodes. The engine control unit 32 provides the write control circuits 44a and 44b with control information.

The first write control circuit 44a includes image development parts 44-1ALLa, 44-1Ca, 44-1Ya, and 44-1Ma for developing and processing image data of the respective colors received from the image processing circuit 23. The first write control circuit 44a further includes LD control parts 44-21a, 44-22a, 44-23a, 44-24a, 44-25a, 44-26a, 44-27a, and 44-28a. The first write control circuit 44a further includes a selector 44-3a for switching connections between the image development parts 44-1ALLa, 44-1Ca, 44-1Ya, and 44-1Ma, and the LD control parts 44-21a, 44-22a, 44-23a, 44-24a, 44-25a, 44-26a, 44-27a, and 44-28a so that image data output from the image development parts 44-1ALLa, 44-1Ca, 44-1Ya, and 44-1Ma may be sent to any of the LD control parts 44-21a, 44-22a, 44-23a, 44-24a, 44-25a, 44-26a, 44-27a, and 44-28a. The engine control unit 32 controls the switching performed by the selector 44-3a. The LD control parts 44-21a, 44-22a, 44-23a, 44-24a, 44-25a, 44-26a, 44-27a, and 44-28a are connected to the LD drivers 28-1a, 28-2a, 28-3a, 28-4a, 28-5a, 28-6a, 28-7a, and 28-8a, respectively, with a one-to-one correspondence.

Similarly, the second write control circuit 44b includes image development parts 44-1ALLb, 44-1Cb, 44-1Yb, and 44-1Mb for developing and processing image data of the respective colors received from the image processing circuit 23. The second write control circuit 44b further includes LD control parts 44-21b, 44-22b, 44-23b, 44-24b, 44-25b, 44-26b, 44-27b, and 44-28b. The second write control circuit 44b further includes a selector 44-3b for switching connections between the image development parts 44-1ALLb, 44-1Cb, 44-1Yb, and 44-1Mb, and the LD control parts 44-21b, 44-22b, 44-23b, 44-24b, 44-25b, 44-26b, 44-27b, and 44-28b so that image data output from the image development parts 44-1ALLb, 44-1Cb, 44-1Yb, and 44-1Mb may be sent to any of the LD control parts 44-21b, 44-22b, 44-23b, 44-24b, 44-25b, 44-26b, 44-27b, and 44-28b. The engine control unit 32 controls the switching performed by the selector 44-3b. The LD control parts 44-21b, 44-22b, 44-23b, 44-24b, 44-25b, 44-26b, 44-27b, and 44-28b are connected to the LD drivers 28-1b, 28-2b, 28-3b, 28-4b, 28-5b, 28-6b, 28-7b, and 28-8b, respectively, with a one-to-one correspondence.

As described above, the configurations of the first and second write control circuits 44a and 44b are the same as the configuration of the write control circuit 44 described above referring to FIGS. 9 to 12. The image development parts 44-1ALLa and 44-1ALLb for black include any function to be also used for any of the colors other than black. Further, at least one of the image development parts 44-1ALLa and 44-1ALLb need to include any function to be used only for any of the colors other than black. In detail, the image development parts 44-1ALLa and 44-1ALLb include both jaggy correction function 43A and forgery prevention function 43B (not shown). Further, the image development parts 44-1Ya and 44-1Yb for yellow need to include any function to be used only for cyan and magenta because the image development parts 44-1Ya and 44-1Yb may be used for cyan or magenta.

With the above configuration, the write control circuit 44 may be used in the color image forming apparatus 500 which uses four laser diodes for each of the four colors so that the color image forming apparatus 500 may form a full color image at high speed.

FIGS. 14A-14D are a block diagram for explaining an exemplary configuration for write control of a color image forming apparatus 600 according to another embodiment of the present invention. The color image forming apparatus 600 forms a full color image by using eight laser diodes for each of four colors, namely black, cyan, yellow, and magenta at considerably high speed. Therefore, the color image forming apparatus 600 needs 32 LD control parts in total to drive the eight laser diodes for each of the four colors. The configuration is suitable for ultrahigh-speed color image forming. The same reference numerals as the reference numerals in the color image forming apparatus 500 shown in FIGS. 13A, 13B represent the same components, and explanations thereof are omitted.

As shown in FIGS. 14A-14D, the color image forming apparatus 600 includes the first and second write control circuits 44a and 44b. The color image forming apparatus 600 further includes a third write control circuit 44c and a fourth write control circuit 44d. The color image forming apparatus 600 further includes LD drivers 28-1c, 28-2c, 28-3c, 28-4c, 28-5c, 28-6c, 28-7c, 28-8c, 28-1d, 28-2d, 28-3d, 28-4d, 28-5d, 28-6d, 28-7d, and 28-8d in addition to the LD drivers 28-1a to 28-8a and 28-1b to 28-8b shown in FIGS. 13A,13B. The color image forming apparatus 600 further includes optical writing units 1c and 1d in addition to 1a and 1b each having eight laser diodes. The engine control unit 32 provides the write control circuits 44a, 44b, 44c, and 44d with control information.

The third write control circuit 44c includes image development parts 44-1ALLc, 44-1Cc, 44-1Yc, and 44-1Mc for developing and processing image data of the respective colors received from the image processing circuit 23. The third write control circuit 44c further includes LD control parts 44-21c, 44-22c, 44-23c, 44-24c, 44-25c, 44-26c, 44-27c, and 44-28c. The third write control circuit 44c further includes a selector 44-3c for switching connections between the image development parts 44-1ALLc, 44-1Cc, 44-1Yc, and 44-1Mc, and the LD control parts 44-21c, 44-22c, 44-23c, 44-24c, 44-25c, 44-26c, 44-27c, and 44-28c so that image data output from the image development parts 44-1ALLc, 44-1Cc, 44-1Yc, and 44-1Mc may be sent to any of the LD control parts 44-21c, 44-22c, 44-23c, 44-24c, 44-25c, 44-26c, 44-27c, and 44-28c. The engine control unit 32 controls the switching performed by the selector 44-3c. The LD control parts 44-21c, 44-22c, 44-23c, 44-24c, 44-25c, 44-26c, 44-27c, and 44-28c are connected to the LD drivers 28-1c, 28-2c, 28-3c, 28-4c, 28-5c, 28-6c, 28-7c, and 28-8c, respectively, with a one-to-one correspondence.

Similarly, the fourth write control circuit 44d includes image development parts 44-1ALLd, 44-1Cd, 44-1Yd, and 44-1Md for developing and processing image data of the respective colors received from the image processing circuit 23. The fourth write control circuit 44d further includes LD control parts 44-21d, 44-22d, 44-23d, 44-24d, 44-25d, 44-26d, 44-27d, and 44-28d. The fourth write control circuit 44d further includes a selector 44-3d for switching connections between the image development parts 44-1ALLd, 44-1Cd, 44-1Yd, and 44-1Md, and the LD control parts 44-21d, 44-22d, 44-23d, 44-24d, 44-25d, 44-26d, 44-27d, and 44-28d so that image data output from the image development parts 44-1ALLd, 44-1Cd, 44-1Yd, and 44-1Yd may be sent to any of the LD control parts 44-21d, 44-22d, 44-23d, 44-24d, 44-25d, 44-26d, 44-27d, and 44-28d. The engine control unit 32 controls the switching performed by the selector 44-3d. The LD control parts 44-21d, 44-22d, 44-23d, 44-24d, 44-25d, 44-26d, 44-27d, and 44-28d are connected to the LD drivers 28-1d, 28-2d, 28-3d, 28-4d, 28-5d, 28-6d, 28-7d, and 28-8d, respectively, with a one-to-one correspondence.

In the embodiment, each of the write control circuits 44a to 44d is able to control driving of a maximum of eight laser diodes for each of a maximum of four colors.

In the embodiment, the image development parts 44-1Ca, 44-1Cb, 44-1Cc, 44-1Cd, 44-1Ya, 44-1Yb, 44-1Yc, 44-1Yd, 44-1Ya, 44-1Mb, 44-1Mc, 44-1Md, for cyan, yellow, and magenta are not actually used. Therefore, including the above-listed image development parts in the color image forming apparatus 600 seems to be redundant. However, using the write control circuits 44a, 4b, 44c, and 44d that can be commonly used in a plurality of models may achieve a cost reduction. Alternatively, the color image forming apparatus 600 may include a common function part, and functions unique to specific colors may be included in the common function part so that any of the image development parts can use the functions as necessary.

In the case of a monochrome image forming apparatus for forming an image by using only black, when the monochrome image forming apparatus forms an image at high speed by using a light source such as a laser diode array (LDA) having a plurality of light emitting points, the write control circuit according to the embodiments of the present invention may support a maximum of eight light emitting points so that image data for black can be supplied to eight LD control parts after the image data is processed in the image development part for black.

According to the embodiments of the present invention, the write control circuit may be commonly used in a color image forming apparatus and a monochrome image forming apparatus. Therefore, it is not needed to develop respective write control circuits for a plurality of models. As a result, costs for developing integrated circuits and labor costs may be reduced, and an image forming apparatus may be developed at low cost.

This patent specification is based on Japanese patent applications, No. JP2005-352135 filed on Dec. 6, 2005, and No. JP2006-326727 filed on Dec. 4, 2006, in the Japan Patent Office, the entire contents of each of which are incorporated by reference herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A write control circuit for controlling a plurality of laser diode driver circuits that respectively drive a plurality of laser diodes each emitting light, the write control circuit comprising:
   a plurality of write control parts mounted on a single semiconductor chip and configured to control the plurality of laser diodes via the plurality of laser diode driver circuits to perform writing for image forming with a plurality of respective colors, wherein each of the plurality of write control parts includes at least one image development part configured to develop and process image data and at least one laser diode control part configured to control driving of the laser diodes via the laser diode driver circuits based on the image data; and
   a switch provided between a group of the image development parts and a group of the laser diode control parts of the plurality of write control parts and configured to switch connections between the image development parts and the laser diode control parts such that the number of the laser diode control parts connected to one of the image developing parts is changed.

2. The write control circuit according to claim 1, wherein the number of the image development parts included in the write control circuit is equal to a maximum number of colors needed for image forming.

3. The write control circuit according to claim 2, wherein the number of the laser diode control parts included in the write control circuit is equal to a maximum number of laser diodes used for writing.

4. The write control circuit of claim 1, wherein the number of the laser diode control parts connected to a specific one of the image developing parts is previously determined according to a specific color of the plurality of respective colors that corresponds to the specific one of the image developing parts.

5. The write control circuit of claim 1, wherein the switch is configured to connect one of the image development parts which supports a particular one of the plurality of respective colors to all of the total number of the laser diode control parts, or to one half of the total number of the laser diode control parts, or to one fourth of the total number of the laser diode control parts.

6. The write control circuit of claim 1, wherein the switch is configured to connect one of the image development parts which supports a black color of the plurality of respective colors to all of the total number of the laser diode control parts so as to perform writing for monochrome image forming.

7. The write control circuit of claim 6, wherein the one of the image development parts which supports the black color includes a function to be used for writing for image forming using any one of the plurality of respective colors.

8. The write control circuit of claim 1, wherein the switch is configured to connect one of the image development parts which supports a color of the plurality of respective colors other than the black color to one half or one fourth of the total number of the laser diode control parts so as to perform writing for color image forming.

9. An image forming apparatus, comprising:
   an optical writing unit configured to write latent images on an image carrier using a plurality of laser diodes each emitting light;
   a plurality of laser diode driver circuits that respectively drive the plurality of laser diodes; and
   at least one write control circuit to control the plurality of laser diode driver circuits, wherein the write control circuit includes:
      a plurality of write control parts mounted on a single semiconductor chip and configured to control the plurality of laser diodes via the plurality of laser diode driver circuits to perform writing for image forming with a plurality of respective colors, each of the plurality of write control parts including at least one image development part configured to develop and process image data and at least one laser diode control part configured to control driving of the laser diodes via the laser diode driver circuits based on the image data; and
      a switch provided between a group of the image development parts and a group of the laser diode control parts of the plurality of write control parts and configured to switch connections between the image development parts and the laser diode control parts such that the number of the laser diode control parts connected to one of the image developing parts is changed.

10. The image forming apparatus of claim 9, further comprising:
    an engine control unit to send control information to the at least one write control circuit so as to change the number of the laser diode control parts connected to one of the image developing parts.

* * * * *